United States Patent
Gomi et al.

(10) Patent No.: US 10,223,712 B2
(45) Date of Patent: Mar. 5, 2019

(54) INFORMATION PROVIDING APPARATUS, ADVERTISEMENT DELIVERY SYSTEM, INFORMATION PROVIDING METHOD, AND INFORMATION PROVIDING PROGRAM

(71) Applicant: YAHOO JAPAN CORPORATION, Tokyo (JP)

(72) Inventors: Hidehito Gomi, Tokyo (JP); Koji Tsukamoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 259 days.

(21) Appl. No.: 13/924,842

(22) Filed: Jun. 24, 2013

(65) Prior Publication Data
US 2013/0346214 A1 Dec. 26, 2013

(30) Foreign Application Priority Data
Jun. 26, 2012 (JP) ................................. 2012-142869

(51) Int. Cl.
G06Q 30/02 (2012.01)
(52) U.S. Cl.
CPC ..... *G06Q 30/0269* (2013.01); *G06Q 30/0241* (2013.01)
(58) Field of Classification Search
CPC ................................. G06Q 30/0207–30/0277
(Continued)

(56) References Cited

U.S. PATENT DOCUMENTS

2008/0000964 A1* 1/2008 Flake ..................... G06Q 30/00
235/380
2008/0183804 A1* 7/2008 Hassett .............. G06Q 30/0277
709/203
(Continued)

FOREIGN PATENT DOCUMENTS

JP  A-2006-323629  11/2006
JP  A-2007-067544  3/2007
(Continued)

OTHER PUBLICATIONS

Office Action issued in Japanese Application No. 2012-142869 dated Mar. 4, 2014 (with translation).
(Continued)

*Primary Examiner* — Ilana L Spar
*Assistant Examiner* — Allan J Woodworth, II
(74) *Attorney, Agent, or Firm* — Oliff PLC

(57) ABSTRACT

There is provided an information providing apparatus including a reception unit, a provision determining unit, and a request reply unit. The reception unit receives provision availability information indicating whether provision of user information for an advertisement delivery apparatus is permitted from a user terminal accessing any one of a plurality of site providing apparatuses or the like. The provision determining unit determines whether the provision availability information corresponding to the user terminal represents a provision permission in a case where an acquisition request for the user information relating to the user terminal is received from the advertisement delivery apparatus. The request reply unit replies to the advertisement delivery apparatus with the user information of the user terminal in a case where the provision permission is determined to be represented by the provision determining unit.

15 Claims, 13 Drawing Sheets

(58) Field of Classification Search
USPC .............................................. 705/14.1–14.73
See application file for complete search history.

(56) References Cited

U.S. PATENT DOCUMENTS

| | | | | |
|---|---|---|---|---|
| 2011/0010243 A1* | 1/2011 | Wilburn | ............. | G06Q 30/0255 705/14.53 |
| 2011/0295899 A1* | 12/2011 | James | ................... | H04L 67/306 707/784 |
| 2011/0314092 A1* | 12/2011 | Lunt | ................. | G06F 17/30876 709/203 |
| 2011/0320741 A1* | 12/2011 | Tian | ................. | G06F 17/30991 711/147 |
| 2012/0054143 A1* | 3/2012 | Doig | ................. | G06Q 30/0243 706/47 |
| 2012/0054680 A1* | 3/2012 | Moonka | ............. | G06Q 30/0269 715/810 |
| 2012/0136941 A1* | 5/2012 | Howes | ................... | H04L 51/14 709/206 |
| 2012/0297017 A1* | 11/2012 | Livshits | ............. | G06Q 30/0201 709/217 |
| 2014/0100965 A1* | 4/2014 | Lessin | ................ | G06Q 30/0269 705/14.66 |

FOREIGN PATENT DOCUMENTS

| | | |
|---|---|---|
| JP | 2009-086154 A | 4/2009 |
| JP | A-2009-145549 | 7/2009 |
| JP | 2009-181334 A | 8/2009 |
| JP | A-2011-108204 | 6/2011 |
| JP | A-2011-209862 | 10/2011 |
| JP | A-2013-084063 | 5/2013 |

OTHER PUBLICATIONS

Feb. 9, 2016 Office Action issued in Japanese Patent Application No. 2014-164561.
Feb. 14, 2017 Office Action issued in Japanese Patent Application No. 2014-164561.

* cited by examiner

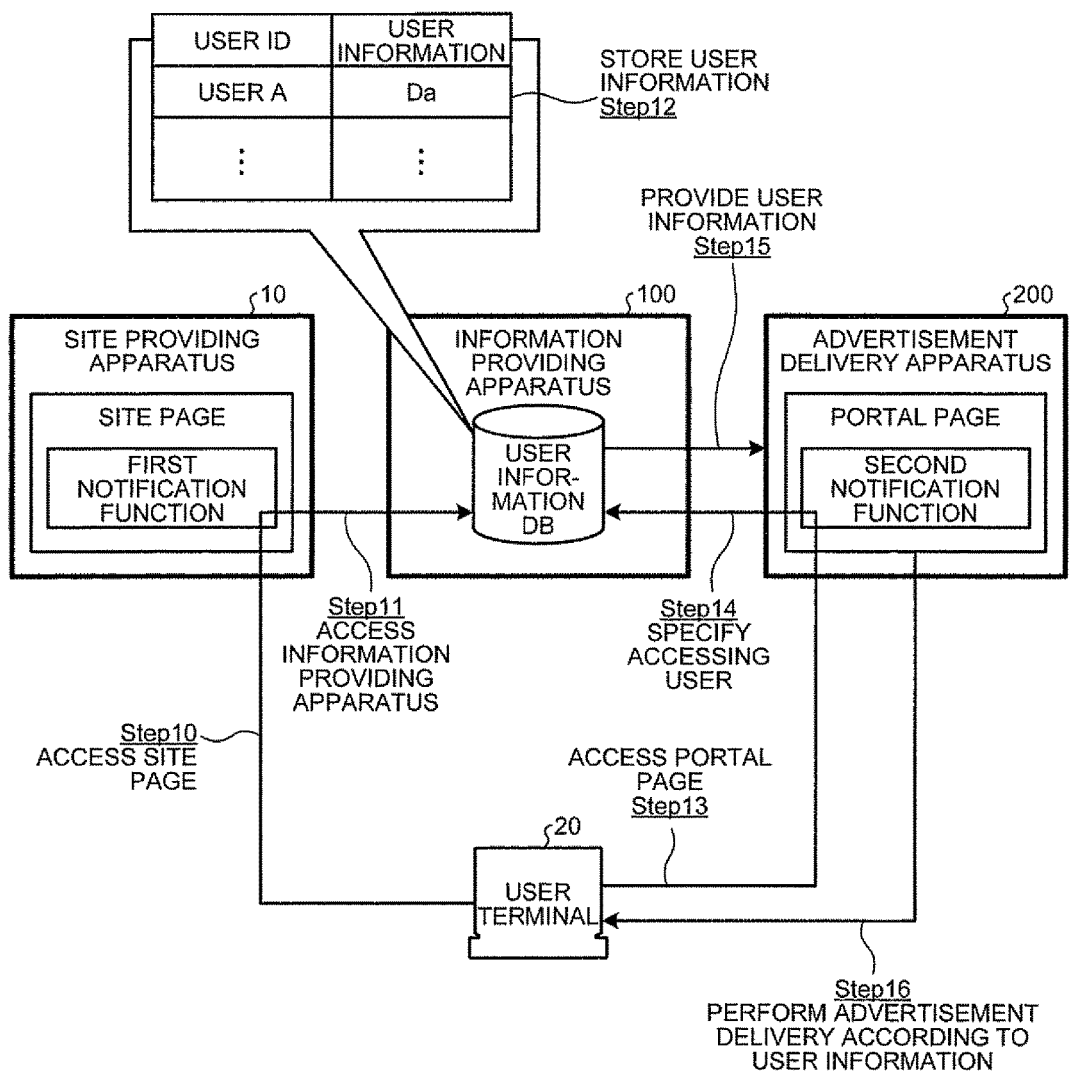

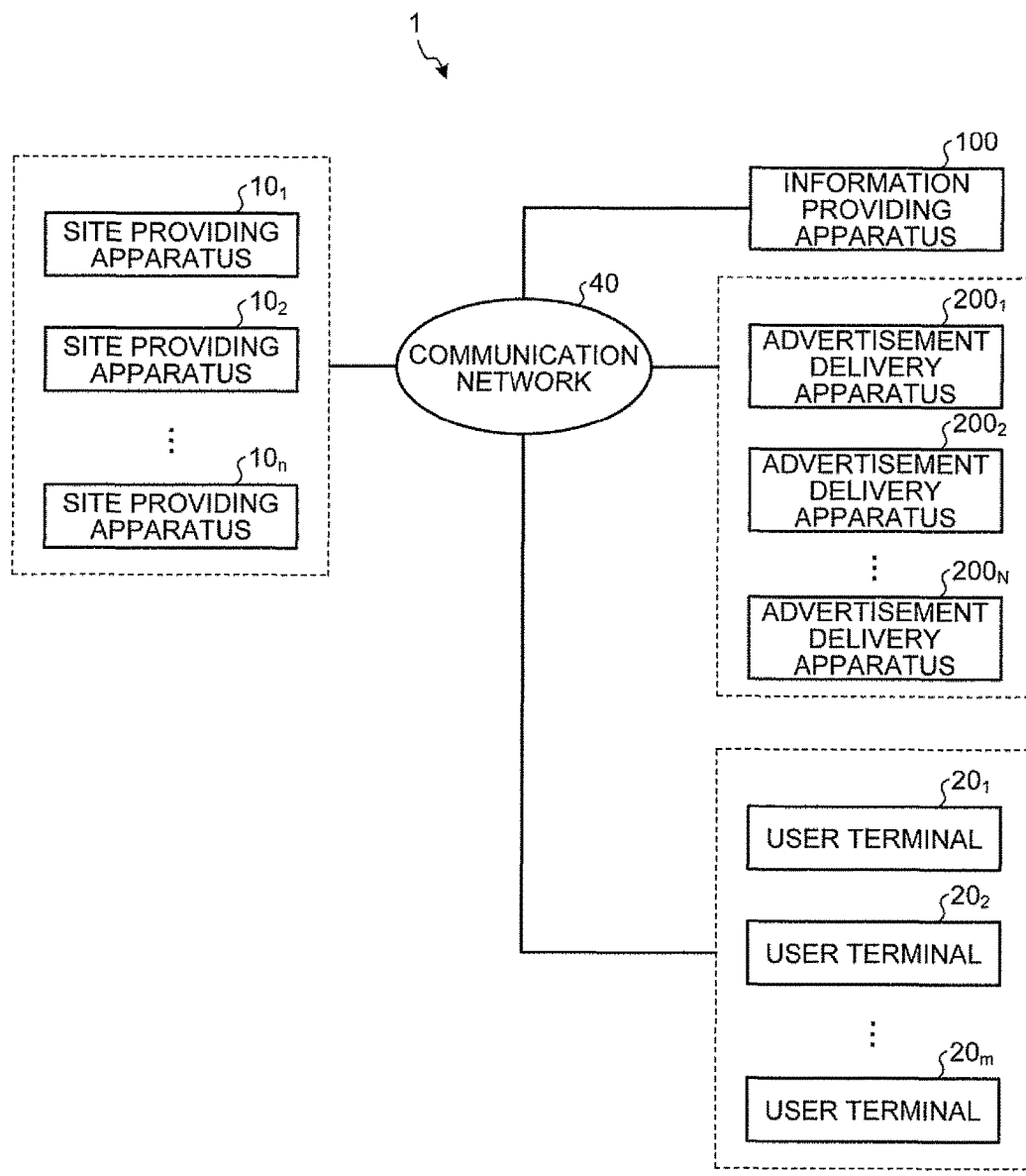

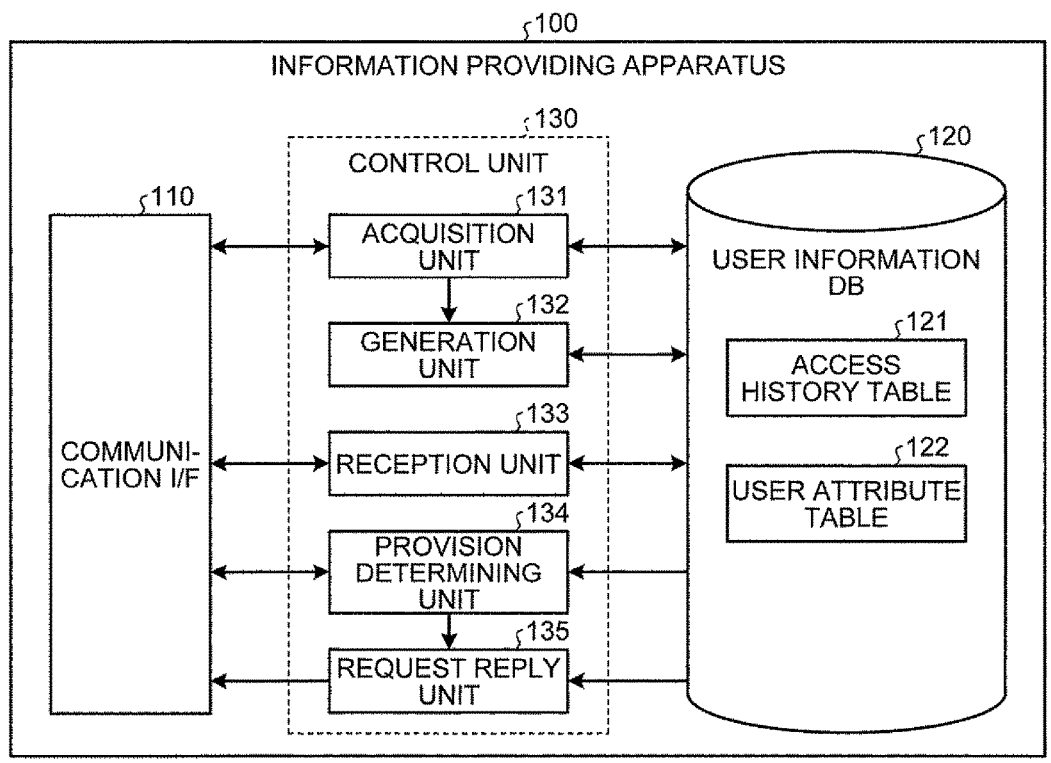

FIG.6

| USER ID | PSYCHOGRAPHIC ATTRIBUTE | | | | | DEMOGRAPHIC ATTRIBUTE | | | PROVISION/NO-PROVISION |
|---|---|---|---|---|---|---|---|---|---|
| | COS-METICS | VEHICLE | CLOTH-ING | TRAV-ELING | ... | SEX | AGE | ... | |
| $20_1$ | 1 | 0 | 1 | 0 | ... | 1 | 28 | ... | NEGATIVE |
| $20_2$ | 1 | 0 | 1 | 0 | ... | 1 | 34 | ... | POSITIVE |
| $20_3$ | 1 | 1 | 0 | 0 | ... | x | 22 | ... | POSITIVE |
| $20_4$ | 0 | 0 | 0 | 0 | ... | 2 | x | ... | NEGATIVE |
| ... | ... | ... | ... | ... | ... | ... | ... | ... | ... |

IS IT OK TO PROVIDE YOUR ACCESS INFORMATION AND THE LIKE FOR ADVERTISEMENT DELIVERY PROVIDER?

▼-SELECTION OF
PROVISION/NO PROVISION
PROVISION
NO PROVISION

TRANSMISSION —B11    CANCEL —B12

|  | 10₁ | 10₂ | ... |
|---|---|---|---|
| 20₁ | NEGATIVE | POSITIVE | ... |
| 20₂ | POSITIVE | POSITIVE | ... |
| ... | ... | ... | ... |

(SITE PROVIDER / USER ID; table 123)

| USER ID \ ADVERTISEMENT DELIVERY PROVIDER | $200_1$ | $200_2$ | ... |
|---|---|---|---|
| $20_1$ | NEGATIVE | POSITIVE | ... |
| $20_2$ | POSITIVE | POSITIVE | ... |
| ... | ... | ... | ... |

INFORMATION PROVIDING APPARATUS, ADVERTISEMENT DELIVERY SYSTEM, INFORMATION PROVIDING METHOD, AND INFORMATION PROVIDING PROGRAM

CROSS-REFERENCE TO RELATED APPLICATION

The present application claims priority to and incorporates by reference the entire contents of Japanese Patent Application No. 2012-142869 filed in Japan on Jun. 26, 2012.

BACKGROUND OF THE INVENTION

1. Field of the Invention

The present invention relates to an information providing apparatus, an advertisement delivery system, an information providing method, and an information providing program.

2. Description of the Related Art

Recently, advertisement delivery through the Internet is actively performed in accordance with rapid spread of the Internet. There is advertisement delivery in which icons representing a company, a product, and the like are displayed at predetermined positions on a web page, and, in a case where such an icon is clicked, a transition to a web page of a corresponding advertiser is made. While the advertisement delivery of such a type is called a banner advertisement or an advertisement link, it may be simply referred to as "advertisement" in description presented here.

In such advertisement delivery, in order to improve the advertisement effect, a targeting delivery is performed in which user information such as tastes, sexes, ages, addresses, and occupations of users are registered in advance, and an advertisement corresponding to the user information is selectively delivered.

There is a case where user information used for the targeting delivery is provided from an information provider to an advertisement delivery provider. For example, a site provider providing a web site collects user information of users who have accessed the web sites. Then, the information provider provides the user information acquired from the site provider for the advertisement delivery provider. In the case of this example, the user information of users who have accessed the web site is provided from the information provider to the advertisement delivery provider regardless of the intentions of the users.

The provision of the user information for the advertisement delivery provider as described above may not be desired by some users, and there is a concern that problems of personal information, privacy, and the like may incur. Accordingly, a case may be considered in which a user requests the site provider of an access target site not to distribute the user information to the advertisement delivery provider. However, since there are a huge number of site providers, in a case where a user requests all the site providers not to distribute the user information, there is a problem in that user's operation burden increases.

SUMMARY OF THE INVENTION

According to one aspect of the embodiments, an information providing apparatus includes a storage unit that stores user information relating to a user terminal accessing any one of a plurality of content providing apparatuses, a reception unit that receives provision availability information indicating whether provision of the user information relating to the user terminal for an advertisement delivery apparatus that delivers advertisement content based on the user information is permitted from the user terminal accessing any one of the plurality of content providing apparatuses or a content providing apparatus accessed by the user terminal, a provision determining unit that determines whether the provision availability information corresponding to the user terminal represents a provision permission in a case where an acquisition request for the user information relating to the user terminal is received from the advertisement delivery apparatus, and a request reply unit that replies to the advertisement delivery apparatus with the user information of the user terminal in a case where the provision permission is determined to be represented by the provision determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a diagram that illustrates an example of an information providing method according to a first embodiment;

FIG. 2 is a diagram that illustrates an example of the configuration of an advertisement delivery system according to the first embodiment;

FIG. 4 is a diagram that illustrates an example of the configuration of an information providing apparatus according to the first embodiment;

FIG. 5 is a diagram that illustrates an example of an access history table according to the first embodiment;

FIG. 6 is a diagram that illustrates an example of a user attribute table according to the first embodiment;

FIG. 10 is a diagram that illustrates an example of a setting screen according to the first embodiment;

DETAILED DESCRIPTION OF THE PREFERRED EMBODIMENTS

Figure 1B:
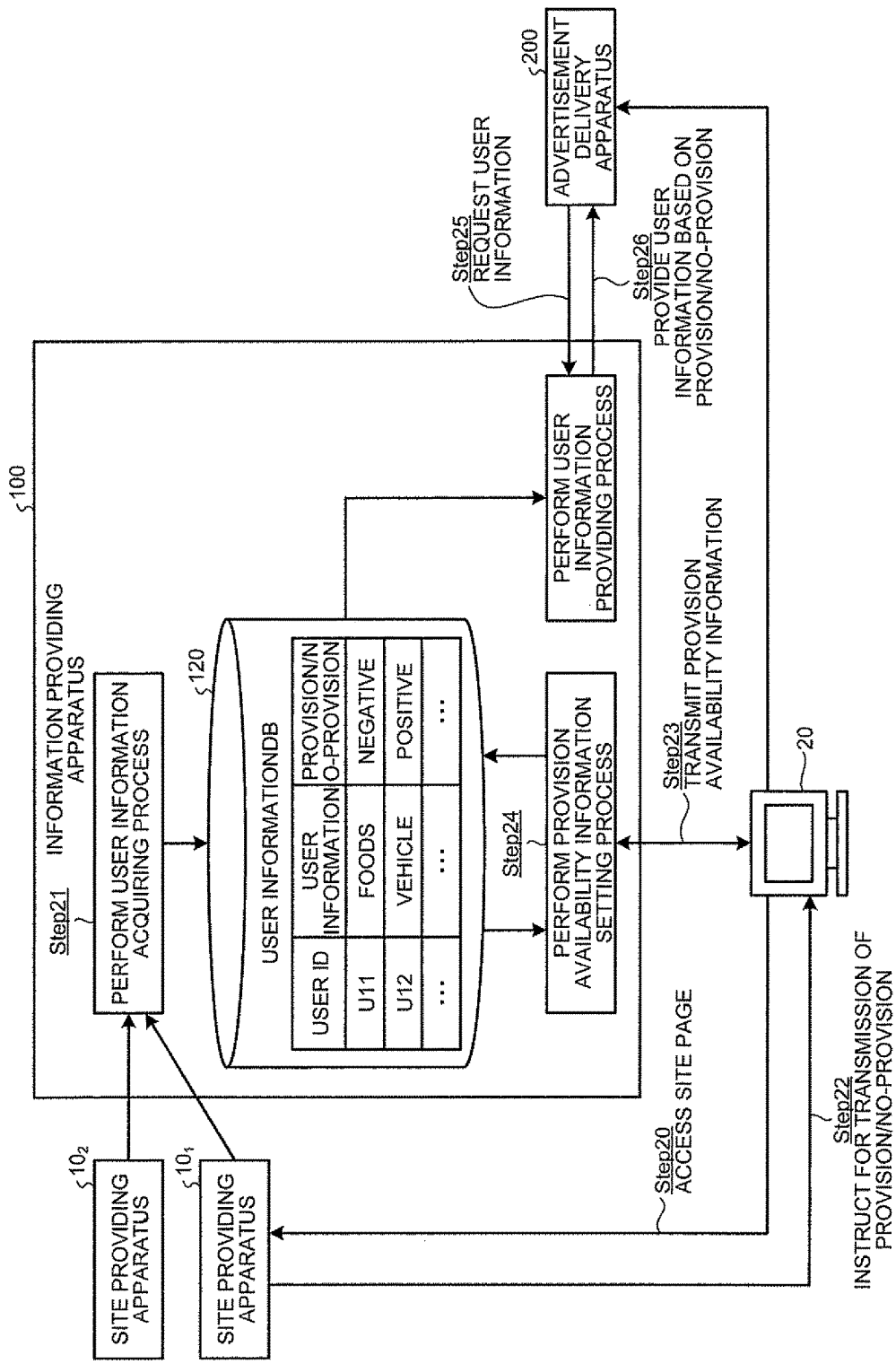
FIG. 1B is a diagram that illustrates an example of the information providing method according to the first embodiment.

Hereinafter, an information providing apparatus, an advertisement delivery system, an information providing method, and an information providing program according to embodiments of the present application (hereinafter, referred to as "embodiments") will be described in detail with reference to the drawings. However, the information providing apparatus, the advertisement delivery system, the information providing method, and the information providing program according to the present application are not limited to the embodiments. In addition, the embodiments may be appropriately combined in a range in which the processing contents are not contradictory to each other. In the embodiments described below, although an internet protocol (IP) network will be described as an example of a communication network to which the information providing apparatus is connected, the communication network is not limited thereto. In addition, in the embodiments described below, while a banner advertisement will be described as an example of advertisement content transmitted from the advertisement delivery apparatus, the advertisement content is not limited thereto.

1. First Embodiment 1-1. Information Providing Method

First, an example of an information providing method according to a first embodiment will be described with reference to FIGS. 1A and 1B. In the information providing method illustrated in FIGS. 1A and 1B, a process of collecting user information using an information providing apparatus 100 and a process of providing the user information for an advertisement delivery apparatus 200 using the information providing apparatus 100 are performed. In this information providing method, in addition to such processes, a process of receiving a setting on whether the information providing apparatus 100 receives the user information from a user terminal 20 and a process of determining whether to provide the advertisement delivery apparatus 200 with the user information based on whether the user information is provided are performed. Hereinafter, such processes will be sequentially described.

First, the process of collecting the user information using the information providing apparatus 100 and the process of providing the advertisement delivery apparatus 200 with the user information using the information providing apparatus 100 will be described with reference to FIG. 1A. While a site providing apparatus 10 and the advertisement delivery apparatus 200 illustrated in FIGS. 1A and 1B provide web pages, hereinafter, in order to discriminate both web pages, a web page provided by the site providing apparatus 10 may be represented as a "site page", and a web page provided by the advertisement delivery apparatus 200 may be represented as a "portal page". Here, for the convenience of description, although the web page is represented as a "portal page", the advertisement delivery apparatus 200 may provide a web page other than the portal site.

As illustrated in FIG. 1A, in order to acquire a site page provided by the site providing apparatus 10, the user terminal 20 accesses the site providing apparatus 10 in Step S10. In the site page provided by the site providing apparatus 10, a notification function (hereinafter, represented as a first notification function) for notifying the information providing apparatus 100 of user identification information used for identifying the user terminal 20 that accesses the site page is embedded. Such a first notification function, for example, is realized by a web beacon.

The user terminal 20 accesses the information providing apparatus 100 based on the first notification function embedded in the site page of the site providing apparatus 10 in Step S11. When being accessed from the user terminal 20 based on the first notification function, the information providing apparatus 100 specifies the site providing apparatus 10 that is an access destination of the user terminal 20 and stores information of the specified access destination in a user information database (DB) in association with user information Da and user identification information (user ID) in Step S12.

Alternatively, the information providing apparatus 100 determines a psychographic attribute or a demographic attribute based on the information of the access destination in addition to the information of the access destination of the user terminal 20 and stores the determined attribute information in the user information DB as the user information Da. In addition, the information providing apparatus 100 may acquire a demographic attribute relating to the user terminal 20 from the site providing apparatus 10 accessed by the user terminal 20 and store the acquired demographic attribute in the user information DB.

As above, the information providing apparatus 100 stores the user information in the user information DB in association with the user identification information. The identification of a user, for example, may be performed by including user identification information in a hypertext transfer protocol (HTTP) cookie (hereinafter, simply referred to as a cookie) that is exchanged between the user terminal 20 and the information providing apparatus 100. In addition, it may be configured such that a program dedicatedly used for the user terminal 20 is set, and the user identification information is transmitted from the dedicated program.

As described above, the information providing apparatus 100 is accessed from the user terminal 20 through the site providing apparatus 10 in cooperation with the site providing apparatus 10, thereby acquiring the user information of the user terminal 20. As above, although there is a case where the site providing apparatus 10 does not directly provide the information providing apparatus 100 with the user information, hereinafter, there are cases where the user information provided for the information providing apparatus 100 as the site providing apparatus 10 allows the user terminal 20 to access the information providing apparatus 100 may be also represented simply as "user information provided by the site providing apparatus 10".

Next, the process of providing the user information for the advertisement delivery apparatus 200 using the information providing apparatus 100 will be described. As illustrated in FIG. 1A, in order to acquire a portal page provided by the advertisement delivery apparatus 200, the user terminal 20 accesses the advertisement delivery apparatus 200 in Step S13. In the portal page of the advertisement delivery apparatus 200, a notification function (hereinafter, referred to as a second notification function) performing a process of notifying the information providing apparatus 100 of the user identification information used for identifying the user terminal 20 accessing the portal page is embedded. For example, such a second notification function, similarly to the above-described first notification function, is realized by a web beacon.

The user terminal 20 accesses the information providing apparatus 100 based on the second notification function embedded in the portal page. When being accessed from the user terminal 20 based on the second notification function, the information providing apparatus 100 identifies a user using the user terminal 20 in Step S14, reads user information Da corresponding to the identified user from the user information DB, and provides the user information Da for the advertisement delivery apparatus 200 in Step S15. For example, the identification of a user may be performed by using the cookie described above or the like.

When acquiring the user information Da from the information providing apparatus 100, the advertisement delivery apparatus 200 selects advertisement content according to the user information Da and transmits the selected advertisement content to the user terminal 20 in Step S16. From this, the advertisement delivery apparatus 200 can perform targeting delivery in which advertisement content according to the user information is selectively delivered.

As above, the advertisement delivery apparatus 200 allows the user terminal 20 to access the information providing apparatus 100, thereby acquiring the user information of the user terminal 20 from the information providing apparatus 100. In other words, the advertisement delivery apparatus 200 transmits a request for acquiring user information to the information providing apparatus 100 through the user terminal 20.

As the example illustrated in FIG. 1A, when the user terminal 20 accesses the portal page, the user information stored in the information providing apparatus 100 is provided for the advertisement delivery provider regardless of a user's intension. While there are cases where the user information is not desired to be provided for the advertisement delivery provider depending on a user, it increases the burden of the user's operation to request a huge number of site providers not to distribute the user information.

Thus, according to the information providing method according to the first embodiment, it can be set altogether whether the user terminal 20 accessing the site providing apparatus 10 may provide the user information for the advertisement delivery apparatus 200. Hereinafter, this point will be described with reference to FIG. 1B.

In the example illustrated in FIG. 1B, the user terminal 20 accesses the site page provided by the site providing apparatus $10_1$ in Step S20. From this, the information providing apparatus 100 acquires the user information of the user terminal 20 from the site providing apparatus $10_1$ through the user terminal 20 and stores the acquired user information in a user information DB 120 in Step S21. In addition, in FIG. 1B, although not illustrated in the figure, even when the user terminal 20 accesses the site providing apparatus $10_2$, the information providing apparatus 100 stores the user information of the user terminal 20 in the user information DB 120.

In the example illustrated in FIG. 1B, the information providing apparatus 100 stores user information indicating that a user identified by a user ID "U11" has an interest in "foods" in the user information DB 120. In addition, the user information DB 120 stores user information indicating that a user identified by a user ID "U12" has an interest in "vehicle" in the user information DB 120. Here, it is assumed that the user U11 of which the user ID is "U11" uses the user terminal 20 illustrated in FIG. 1B. In addition, it is assumed that the user U12 of which the user ID is "U12" uses another user terminal not illustrated in the figure.

The process up to here is the same as that of the example illustrated in FIG. 1A. When being accessed from the user terminal 20 in Step S20, the site providing apparatus $10_1$ notifies the user terminal 20 to transmit "provision availability information" to the information providing apparatus 100 in Step S22. The "provision availability information" described here is information indicating whether provision of the user information for the advertisement delivery apparatus 200 from the information providing apparatus 100 is permitted.

The user terminal 20 that has received the notification transmits the provision availability information to the information providing apparatus 100 in Step S23. More specifically, when being accessed from the user terminal 20, the information providing apparatus 100 transmits a setting screen used for setting whether to provide the user information to the user terminal 20. Then, the information providing apparatus 100 stores provision availability information set on the setting screen in the user information DB 120 in Step S24.

Thereafter, as the user terminal 20 accessed the portal page, the advertisement delivery apparatus 200 requests the information providing apparatus 100 for the user information of the user terminal 20 in Step S25. At this time, the information providing apparatus 100 provides the advertisement delivery apparatus 200 with the user information of the user terminal 20 based on the provision availability information stored in the user information DB 120 in Step S26.

More specifically, the information providing apparatus 100 refers to the provision availability information corresponding to the user terminal 20, thereby determining whether it is permitted to provide the advertisement delivery apparatus 200 with the user information. In a case where the provision is permitted, the information providing apparatus 100 provides the advertisement delivery apparatus 200 with the user information. On the other hand, in a case where the provision is not permitted, the information providing apparatus 100 does not provide the advertisement delivery apparatus 200 with the user information. In the example illustrated in FIG. 1B, the user information DB 120 stores the provision availability information indicating no provision in association with the user ID "U11" therein. Accordingly, the information providing apparatus 100 does not provide the advertisement delivery apparatus 200 with the user information of the user terminal 20 of which the user ID is "U11".

As above, in the information providing method according to the first embodiment, user information provided from a plurality of site providing apparatuses $10_1$ such as user information provided from the site providing apparatus $10_1$ as the user information of the user terminal 20, user information provided from the site providing apparatus $10_2$, and the like is stored in the user information DB 120. Then, the user terminal 20 may set whether to provide the advertisement delivery apparatus 200 with the user information altogether in the information providing apparatus 100. In other words, in the information providing method according to the first embodiment, even when there are a huge number of site providing apparatuses, the user terminal 20 may set whether to distribute the user information to the advertisement delivery apparatus 200 without increasing the operation burden of the user.

In addition, in the description presented above, while information of user's access to the site page of the site providing apparatus 10 or information that is based thereon is set as the user information, the user information is not limited thereto. In other words, access information for a providing apparatus providing a user with content or information that is based thereon may be set as the user information.

Hereinafter, the site providing apparatus 10, the information providing apparatus 100, and the advertisement delivery apparatus 200 performing the information providing method according to the first embodiment will be described in detail with reference to FIGS. 2 to 11. In addition, hereinafter, a process of not allowing a user to set provision/no-provision any number of times will be described in addition to the setting process illustrated in FIG. 1B.

1-2. Configuration of Advertisement Delivery System

Next, the configuration of the advertisement delivery system in which the advertisement delivery apparatus according to the first embodiment is included will be described with reference to FIG. 2. As illustrated in FIG. 2, in an advertisement delivery system 1 according to the first embodiment, site providing apparatuses $10_1$ to $10_n$, user terminals $20_1$ to $20_m$, the information providing apparatus 100, and advertisement delivery apparatuses $200_1$ to $200_N$ are included. The various apparatuses are connected to be communicable with each other through a communication network 40. The site providing apparatuses $10_1$ to $10_n$ are managed by site operators, the information providing apparatus 100 is managed by an information provider, and the advertisement delivery apparatuses $200_1$ to $200_N$ are managed by an advertisement delivery provider. In FIG. 2, although one information providing apparatus 100 is illustrated in the figure, there are cases where a plurality of information providing apparatuses 100 are included in the advertisement delivery system 1.

Hereinafter, when the site providing apparatuses $10_1$ to $10_n$ do not need to be discriminated from another, these may be collected represented as a "site providing apparatus 10". In addition, when the user terminals $20_1$ to $20_m$ do not need to be discriminated from one another, these may be collectively represented as a "user terminal 20". Furthermore, when the advertisement delivery apparatuses $200_1$ to $200_N$ do not need to be discriminated from one another, these may be represented as an "advertisement delivery apparatus 200".

The site providing apparatus 10 is a server apparatus that provides various site pages when being accessed from the user terminal 20. As described above, in a page provided by the site providing apparatus 10, the first notification function that is realized by a web beacon or the like is embedded. For example, the web beacon has a function for enabling the user terminal 20 accessing the site page to access a transparent image or a very small image (may be referred to as a "clear GIF") stored in the information providing apparatus 100. From this, the information providing apparatus 100 can acquire information from the user terminal 20. In the information acquired using the web beacon, which is the notification program, by the information providing apparatus 100 from the user terminal 20, information such as identification information of the site providing apparatus 10 and access unique information that is unique for each access to the site page are included. For example, the identification information of the information providing apparatus 100 and the access unique information are set in a query of an HTTP request, which is transmitted from the user terminal 20 to the information providing apparatus 100, by the first notification function.

The user terminal 20 is a personal computer (PC), a personal digital assistant (PDA), or the like that is used by a user. The user terminal 20 accesses a site page provided by the site providing apparatus 10 or a portal page provided by the advertisement delivery apparatus 200 in accordance with a user's operation.

The advertisement delivery apparatus 200 is an information processing apparatus that provides a portal page (for example, a web page such as a portal site) including advertisement content such as a banner advertisement when there is an access from the user terminal 20. As described above, in the portal page provided by the advertisement delivery apparatus 200, the second notification function realized by a web beacon or the like is embedded. The web beacon has a function for enabling the user terminal 20 accessing the portal page to access a transparent image or a very small image stored in the information providing apparatus 100. From this, the information providing apparatus 100 acquires information from the user terminal 20. In the information acquired by the information providing apparatus 100 from the user terminal 20 based on the second notification function, information such as identification information of the advertisement delivery apparatus 200 and access unique information that is unique for each access to the portal page are included. For example, the identification information of the advertisement delivery apparatus 200 and the access unique information are set in a query of an HTTP request, which is transmitted from the user terminal 20 to the information providing apparatus 100, by the second notification function.

The information providing apparatus 100 is an information processing apparatus that collects an access status of the user terminal 20 to the site providing apparatus 10 and provides user information for the advertisement delivery apparatus 200 based on such a collection result. The information providing apparatus 100 collects user information through a plurality of site providing apparatuses 10 in cooperation with a site operator, performs integration, processing, or the like of the collected user information, and provides resultant user information for the advertisement delivery apparatus 200. The information provider managing the information providing apparatus 100 acquires a compensation for the provision of the user information from the advertisement delivery provider and pays a compensation for the cooperation for the acquisition of the user information to the site operator.

The information providing apparatus 100 according to the first embodiment receives an access from the user terminal 20 based on the first notification function as the user terminals 20 access site pages provided by a plurality of the site providing apparatus 10. At this time, the information providing apparatus 100 transmits or receives user identification information to or from the user terminals 20, thereby identifying each user terminal 20. For example, the information providing apparatus 100 transmits cookies or the like to the user terminals 20 as the user identification information. From this, the information providing apparatus 100 can identify the user terminal 20 that has accessed to a specific site and thus can acquire the user information (a site page access history or the like) of the user terminal 20. Then, the information providing apparatus 100 provides such various user information to the advertisement delivery apparatus 200, thereby enabling targeting delivery using the advertisement delivery apparatus 200.

1-3. Configuration of Site Providing Apparatus 10

Figure 3:
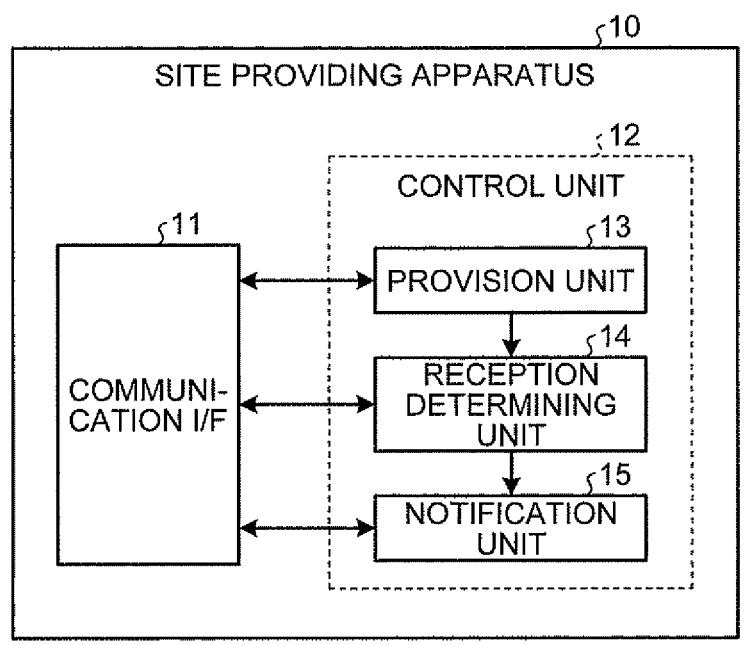
FIG. 3 is a diagram that illustrates an example of the configuration of a site providing apparatus according to the first embodiment.

Next, the configuration of the site providing apparatus 10 according to the first embodiment will be described with reference to FIG. 3. As illustrated in FIG. 3 as an example, the site providing apparatus 10 according to the first embodiment includes a communication interface (I/F) 11 and a control unit 12.

The communication I/F 11, for example, is a network interface card (NIC) or the like. The control unit 12 transmits and receives various kinds of data between the user terminal 20 and the information providing apparatus 100 connected to the communication network 40 through the communication I/F 11.

The control unit 12 includes a provision unit 13, a reception determining unit 14, and a notification unit 15. Such the control unit 12, for example, is realized by an integrated circuit such as an application specific integrated circuit (ASIC) or a field programmable gate array (FPGA). In addition, the control unit 12, for example, is realized by a program stored in a storage device not illustrated in the figure being executed using RAM as an operating area by a central processing unit (CPU), a micro processing unit (MPU), or the like. The control unit 12 realizes or performs the function or the action of information processing described below.

1-4. Configuration of Information Providing Apparatus 100

Next, the configuration of the information providing apparatus 100 according to the first embodiment will be described with reference to FIG. 4. As illustrated in FIG. 4 as an example, the information providing apparatus 100 according to the first embodiment includes a communication I/F 110, the user information DB 120, and a control unit 130.

The communication I/F 110, for example, is a network interface card (NIC) or the like. The control unit 130 transmits and receives various kinds of data between the site providing apparatus 10, the user terminal 20, and the advertisement delivery apparatus 200 connected to the communication network 40 through the communication I/F 110.

In the user information DB 120, an access history table 121 and a user attribute table 122 are included. Such the user information DB 120, for example, is a memory device such as random access memory (RAM) or flash memory or a storage device such as a hard disk or an optical disc.

The control unit 130 includes an acquisition unit 131, a generation unit 132, a reception unit 133, a provision determining unit 134, and a request reply unit 135. Such the control unit 130, for example, is realized by an integrated circuit such as an ASIC or an FPGA. In addition, the control unit 130, for example, is realized by a program stored in a storage device not illustrated in the figure being executed using RAM as an operating area by a CPU, an MPU, or the like. The control unit 130 realizes or performs the function or the action of information processing described below.

1-4 (1) Access History Table 121

Next, an example of the access history table 121 will be described with reference to FIG. 5. The access history table 121 stores information indicating a history of each user terminal 20 accessing each site providing apparatus 10. In the example illustrated in FIG. 5, in the access history table 121, information in which "access destination information" and "access times information" are associated with each "user ID" is included.

The "user ID" is user identification information used for identifying the user terminal 20. Such the "user ID" is information that is assigned to each user terminal 20 by the information providing apparatus 100. For example, the "user ID" is embedded in a cookie that is transmitted and received between the information providing apparatus 100 and the user terminal 20. In addition, in a case where a plurality of browsers is mounted in the user terminal 20, a plurality of "user IDs" are assigned to one user terminal 20. Here, for the simplification of description, it is assumed that one browser is mounted in the user terminal 20.

The "access destination information" is information indicating site providing apparatuses 10 accessed by the user terminal 20. In addition, the "access times information" is information that represents the number of times for which the user terminal 20 accesses the site providing apparatus 10.

In the example illustrated in FIG. 5, it is assumed that the "user IDs" of the access history table 121 correspond to reference signs assigned to the user terminals $20_1$ to $20_m$ illustrated in FIG. 2. In addition, the "access destination information" of the access history table 121 corresponds to reference signs $10_1$ to $10_n$ illustrated in FIG.

In other words, in the example illustrated in FIG. 5, it is represented that the user terminal $20_1$ has accessed the site providing apparatus $10_1$ ten times and has accessed the site providing apparatus $10_2$ once. In addition, it is represented that a user terminal $20_2$ has not accessed the site providing apparatus $10_1$ but has accessed the site providing apparatus $10_2$ twenty-nine times. As above, the access history table 121 illustrated in FIG. 5 as an example stores an access history indicating that each user terminal 20 has accessed specific sites as the user information.

1-4 (2) User Attribute Table 122

Next, an example of the user attribute table 122 will be described with reference to FIG. 6. The user attribute table 122 stores user information in which a user ID and user's attribute information are associated with each other. In the example illustrated in FIG. 6, a "psychographic attribute" and a "demographic attribute", and "provision/no-provision" are stored for each "user ID" in the user attribute table 122.

The "psychographic attribute" is information that represents sense of values, a life style, characteristics, tastes, and the like of each user. The "psychographic attribute", for example, is classified into attribute divisions of "cosmetics, "vehicle", "clothes", "traveling", and the like. In the example illustrated in FIG. 6, for each attribute division, "1" is stored in a case where the user's taste is relatively high, and "0" is stored otherwise. However, each attribute division is not limited thereto, and, for example, information evaluating the user's taste in three or more levels may be stored in each attribute division. In addition, the "psychographic attribute" is not limited to the example of the attribute division illustrated in FIG. 6, but various attribute divisions such as motorcycle, economic, and the like may be included therein.

The "demographic attribute" represents the demographic user's attribute information. The "demographic attribute", for example, is classified into attribute divisions such as "sex", "age", and the like of the user. In the "sex" illustrated in FIG. 6, "1" is stored in a case where the user is female, "2" is stored in a case where the user is male, and "x" is stored in a case where the sex of the user is unknown. In addition, in the "age", the user's age is stored, and "x" is stored in a case where the user's age is unknown. Furthermore, the "demographic attribute" is not limited to the example of the attribute division illustrated in FIG. 6, but various attribute divisions such as the occupation, the family, the annual income, the address, the education, and the like of the user may be included therein.

Each attribute information that is the user information stored in the user attribute table 122 is generated by integrating and estimating the user information and the like stored in the access history table 121 using the generation unit 132 to be described later.

The "provision/no-provision" indicates whether the user information is permitted to be provided for the advertisement delivery apparatus 200. In the "provision/no-provision" illustrated in FIG. 6, "permission" is stored in a case where the provision of the user information for the advertisement delivery apparatus 200 is permitted, and "opposition" is stored in a case where the provision of the user information for the advertisement delivery apparatus 200 is not permitted. In FIG. 6, while an example is illustrated in which "permission" or "opposition" is stored in the "provision/no-provision", actually, a code value (for example, "1" indicating "permission", "2" indicating "opposition", or the like) indicating "permission" or "opposition" is stored therein.

For example, in the example illustrated in FIG. 6, it is represented that the user terminal 20$_1$ corresponding to the user ID "20$_1$" does not permit to provide the user information for the advertisement delivery apparatus 200, and the user terminal 20$_2$ corresponding to the user ID "20$_2$" permits to provide the user information for the advertisement delivery apparatus 200.

1-5. Configuration of Advertisement Delivery Apparatus 200

Figure 7:
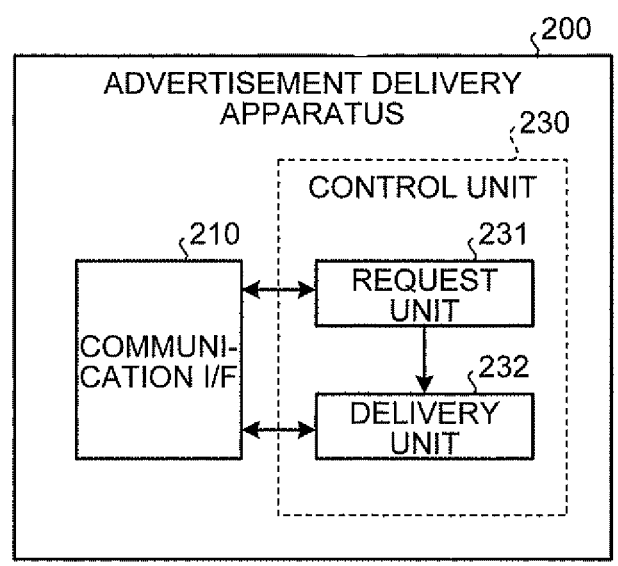
FIG. 7 is a diagram that illustrates an example of the configuration of an advertisement delivery apparatus according to the first embodiment.

Next, the configuration of the advertisement delivery apparatus 200 according to the first embodiment will be described with reference to FIG. 7. As illustrated in FIG. 7 as an example, the advertisement delivery apparatus 200 according to the first embodiment includes a communication I/F 210 and a control unit 230.

The communication I/F 210, for example, is an NIC or the like. The control unit 230 transmits and receives various kinds of data between the user terminal 20 and the information providing apparatus 100 connected to the communication network 40 through the communication I/F 210.

The control unit 230 includes a request unit 231 and a delivery unit 232. Such the control unit 230, for example, is realized by an integrated circuit such as an ASIC or an FPGA. In addition, the control unit 230, for example, is realized by a program stored in a storage device not illustrated in the figure being executed using RAM as an operating area by a CPU, an MPU, or the like. The control unit 230 realizes or performs the function or the action of information processing described below.

1-6. Action (Attribute Information Updating Process)

Next, the sequence of an attribute information updating process of the information providing apparatus 100 according to the first embodiment will be described with reference to FIG. 8. The attribute information updating process is a process that is repeatedly performed by the control unit 130.

Figure 8:
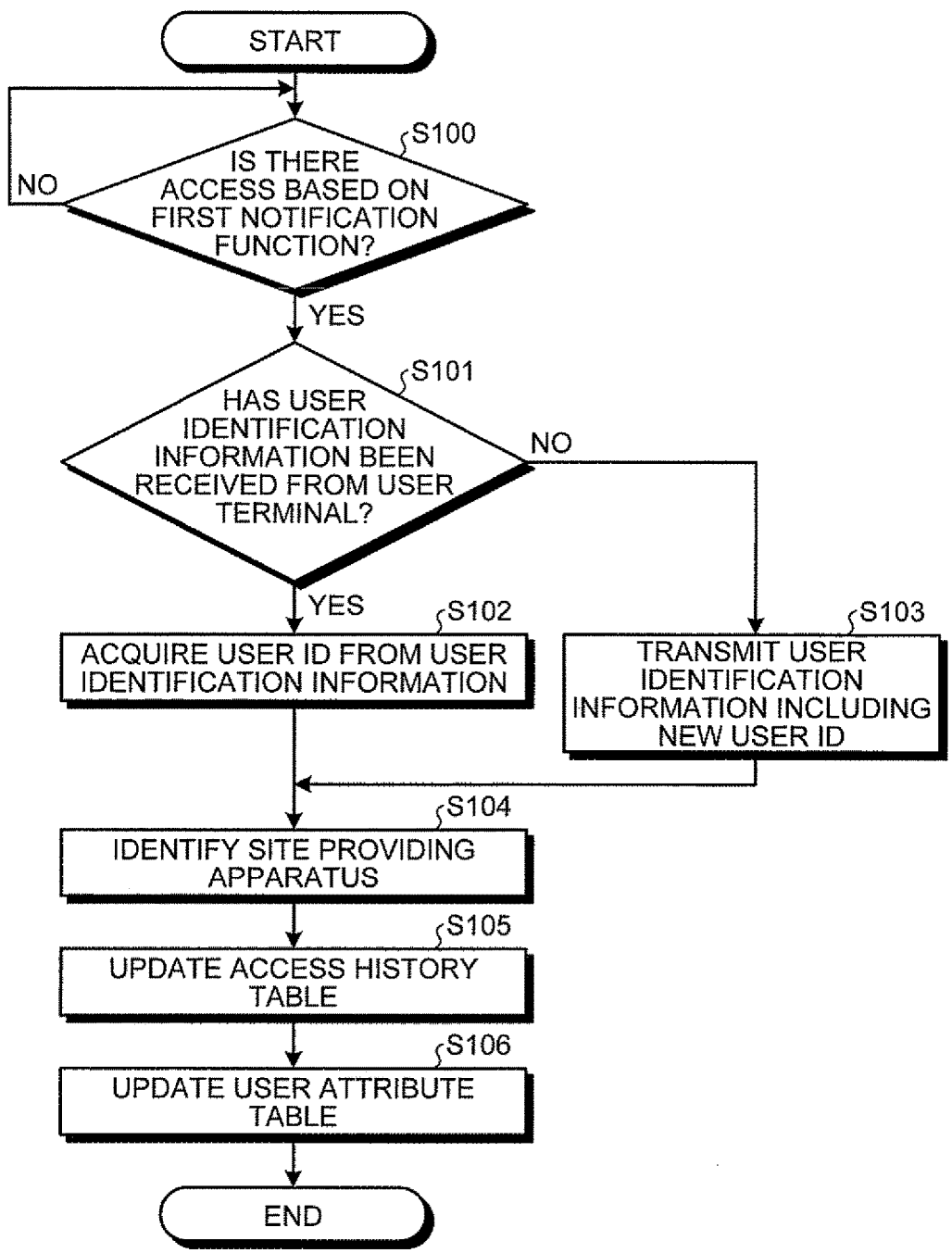
FIG. 8 is a flowchart that illustrates the sequence of an attribute information updating process of the information providing apparatus according to the first embodiment.

As illustrated in FIG. 8, the acquisition unit 131 of the information providing apparatus 100 determines whether or not there is an access from the user terminal 20 that is based on the first notification function in Step S100. For example, the acquisition unit 131 determines whether or not there is an access that is based on a web beacon embedded in a site page provided by the site providing apparatus 10. In such a process, in a case where there is no access that is based on the first notification function from the user terminal 20 (No in Step S100), the acquisition unit 131 waits until there is an access that is based on the first notification function.

On the other hand, in a case where there is an access that is based on the first notification function from the user terminal 20 (Yes in Step S100), the acquisition unit 131 determines whether user identification information has been received from the user terminal 20 in Step S101. For example, the acquisition unit 131 determines whether a cookie has been received from the user terminal 20.

In a case where the user identification information has been received from the user terminal 20 (Yes in Step S101), the acquisition unit 131 acquires a user ID of the user terminal 20 based on the acquired user identification information in Step S102. On the other hand, in a case where the user identification information has not been received from the user terminal 20 (No in Step S101), the acquisition unit 131 generates user identification information such as a cookie including a new user ID that is not included in the access history table 121 and transmits the generated user identification information to the user terminal 20 in Step S103.

Subsequently, the acquisition unit 131 identifies the site providing apparatus 10 that provides the site page, which includes the first notification function, accessed from the user terminal 20 in Step S104. More specifically, the acquisition unit 131 receives the identification information of the site providing apparatus 10 from the user terminal 20 that has made an access that is based on the first notification function, and accordingly, the acquisition unit 131 identifies the site providing apparatus 10 based on the identification information. For example, when an access is made based on the first notification function, the user terminal 20 accesses the information providing apparatus 100 with the identification information of the site providing apparatus 10 and access unique information that is different for each access being added to the site page to the URL of the access destination. In a case where an access that is based on the first notification function is made by the user terminal 20, the acquisition unit 131 identifies the site providing apparatus 10 accessed by the user terminal 20 based on the identification information of the site providing apparatus 10 and the access unique information for the site page.

Subsequently, the acquisition unit 131 updates information corresponding to the user ID of the user terminal 20 acquired in Step S102 or the user ID of the user terminal 20 newly assigned in Step S103 and the site providing apparatus 10 acquired in Step S104 in the access history table 121 in Step S105. For example, in a case where the access history table 121 is in a state illustrated in FIG. 5, when the user terminal 20$_1$ accesses the site providing apparatus 10$_1$, the acquisition unit 131 updates the access times information corresponding to a user ID of "20$_1$" and access destination information of "10$_1$" from "10" to "11".

Subsequently, the generation unit 132 updates the user attribute table 122 based on the access history table 121 updated by the acquisition unit 131 in Step S106. More specifically, the generation unit 132 generates a psychographic attribute corresponding to the user ID based on various kinds of information included in the access history table 121 corresponding to the user ID updated by the acquisition unit 131 and stores the generated attribute information in the user attribute table 122. Then, when the update of the user attribute table 122 is completed, the generation unit 132 ends the attribute information updating process.

In addition, the site providing apparatus 10 may maintain user's attribute information (the psychographic attribute or the demographic attribute) relating to a member user of the site page or the like. In such a case, when the access that is based on the first notification function is made by the user terminal 20, the site providing apparatus 10 may transmit the attribute information (the psychographic attribute or the demographic attribute) of the user terminal 20 to the information providing apparatus 100 together with the access unique information corresponding to the access to the site page that is made by the user terminal 20. In this case, the acquisition unit 131 of the information providing apparatus 100 specifies the user terminal 20 that has made an access that is based on the first notification function embedded in the site page corresponding to the access unique information received from the site providing apparatus 10. Although not illustrated in FIG. 5, the acquisition unit 131 stores the attribute information (the psychographic attribute or the demographic attribute) received from the site providing apparatus 10 in the access history table 121 in association with the user ID of the user terminal 20 that has made the access. In such a case, the generation unit 132 integrates the attribute information stored in the access history table 121, thereby generating and updating the user attribute table 122.

Here, although the generation unit 132 updates the user attribute table 122 every time when the access history table 121 is updated, the generation unit 132 may update the user attribute table 122 every time when the information of the access history table 121 is updated a predetermined number of times. Furthermore, the generation unit 132 may update the user attribute table 122 every time when the information corresponding to each user ID included in the access history table 121 is updates a predetermined number of times.

In addition, the generation unit 132 may use any one of various methods, as the method of generating the user attribute table 122 based on the access history table 121, in other words, the method of estimating the user's attribute information based on the history of user's accesses to the web site. For example, it is assumed that the site providing apparatus $10_1$ provides a site page relating to "cosmetics". In such a case, when the user terminal $20_1$ accesses the site providing apparatus $10_1$, the generation unit 132 can estimate that a user using the user terminal $20_1$ is interested in the "cosmetics". At this time, the generation unit 132 may estimate the sex of the user using the user terminal $20_1$ as "female". As above, the generation unit 132 may estimate the demographic attribute based on the access history. In the case of this example, the generation unit 132 updates information of "cosmetics" and "sex", which is included in the user attribute table 122, corresponding to the user ID "$20_1$" to "1".

In addition, for example, it is assumed that the site providing apparatus $10_1$ provides a site page relating to "cosmetics", and the site providing apparatus $10_3$ provides a site page relating to "female clothing". In such a case, when the user terminal $20_1$ accesses the site providing apparatuses $10_1$ and $10_3$, the generation unit 132 may estimate that the sex of a user using the user terminal $20_1$ is "female". Here, the generation unit 132 can estimate the user's sex as "female" with high accuracy by integrating the information indicating the access to the site providing apparatus $10_1$ and the information indicating the access to the site providing apparatus $10_3$ instead of only using the information indicating the access of the user terminal $20_1$ to the site providing apparatus $10_1$. In other words, as the more information acquired by the acquisition unit 131 is integrated, the generation unit 132 can estimated the user's attribute information with higher accuracy. In the case of this example, the generation unit 132 updates the information of the "sex", which is included in the user attribute table 122, corresponding to the user ID "$20_1$" to "1".

As above, the acquisition unit 131 acquires the user ID of the user terminal 20 based on the user identification information such as a cookie acquired from the user terminal 20 that has made an access based on the first notification function and acquires the information of the site providing apparatus 10 accessed by the user terminal 20. Then, the acquisition unit 131 generates and updates the access history table 121 based on the acquired information. Then, the generation unit 132 generates and updates the user attribute table 122.

As a method of generating the user attribute table 122 based on the access history table 121, for example, any one of various methods including a method using a collaborative filtering technique in which taste information (product purchase history information, site access history information, or the like) of many and unspecified users is additionally stored in the user information DB 120, and a user's attribute is estimated based on the taste information.

1-7. Action (Provision/No-Provision Setting Process)

Next, the sequence of a provision/no-provision setting process of the advertisement delivery system 1 according to the first embodiment will be described with reference to FIG. 9.

Figure 9:
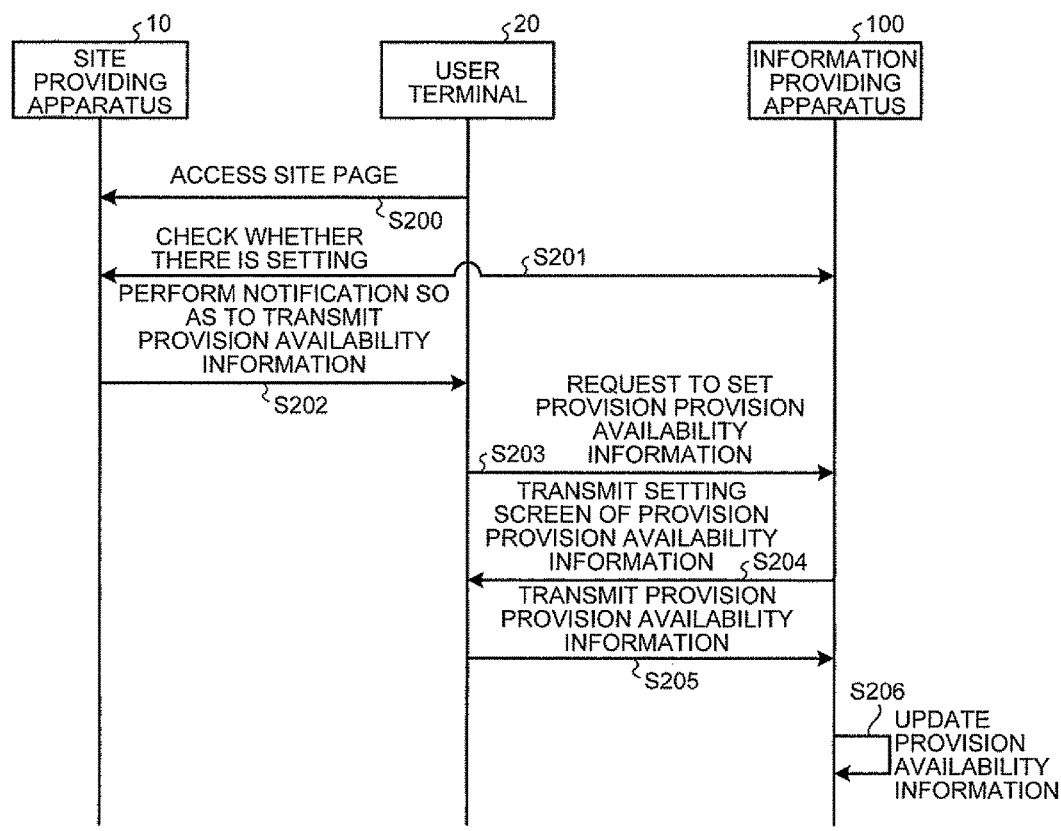
FIG. 9 is a sequence diagram that illustrates the sequence of a provision/no-provision setting process of the advertisement delivery system according to the first embodiment.

As illustrated in FIG. 9, the user terminal 20 accesses a site page provided by the provision unit 13 of the site providing apparatus 10 in Step S200. In addition, the user terminal 20 that has made the access accesses the information providing apparatus 100 based on the first notification function. From this, the attribute information updating process illustrated in FIG. 8 is performed by the information providing apparatus 100.

Meanwhile, when an access to the site page is made from the user terminal 20, the reception determining unit 14 of the site providing apparatus 10 determines whether a state is formed in which the reception of the provision availability information corresponding to the user terminal 20 has been completed in the information providing apparatus 100 by inquiring the information providing apparatus 100 thereof in Step S201.

More specifically, the reception determining unit 14 transmits an inquiry request including the user ID to the information providing apparatus 100. Then, the control unit 130 of the information providing apparatus 100 determines whether provision/no-provision corresponding to the user ID included in the inquiry request is stored in the user attribute table 122. Then, in a case where the provision/no-provision is stored, the control unit 130 replies to the site providing apparatus 10 with an indication of the state in which the provision availability information of the user terminal 20 has been received. On the other hand, in a case where the provision/no-provision is not stored, the control unit 130 replies to the site providing apparatus 10 with an indication indicating a state in which the reception of the provision availability information has not been completed.

Then, in the case of the state in which the reception has been completed by the information providing apparatus 100 as a result of the determination made by the reception determining unit 14, the site providing apparatus 10 ends the provision/no-provision setting process illustrated in FIG. 9. On the other hand, in the case of the state in which the reception has not been completed by the information providing apparatus 100, the notification unit 15 of the site providing apparatus 10 notifies the user terminal 20 for the transmission of the provision availability information to the information providing apparatus 100 in Step S202.

For example, the notification unit 15 performs a pop-up display of a statement "Do you want to set whether to transmit your information to another company?" on a browser of the user terminal 20 on which the site page is displayed. Then, in a case where "No" is selected by the user in the pop-up display, the information providing apparatus 100 ends the provision/no-provision setting process illustrated in FIG. 9. On the other hand, in a case where "Yes" is selected by the user in the pop-up display, the notification unit 15 notifies the user terminal 20 so as to transmit the provision availability information to the information providing apparatus 100. At this time, the notification unit 15 may notify the user terminal 20 of information (an IP address or an URL) used for accessing the information providing apparatus 100.

Then, in a case where the notification is made from the notification unit 15, the user terminal 20 transmits a setting request for setting the provision availability information to the information providing apparatus 100 in Step S203. The reception unit 133 of the information providing apparatus 100 that has received such a setting request transmits a setting screen used for setting the provision availability information to the user terminal 20 in Step S204.

Here, FIG. 10 illustrates an example of the setting screen G11 transmitted by the reception unit 133. In the setting screen G11 illustrated in FIG. 10 as an example, a selection pull-down menu P11 used for selecting provision/no-provision, a transmission button B11, and a cancel button B12 are included. When the provision or the no-provision is selected in the selection pull-down menu P11 and then the transmission button B11 is pressed, the user terminal 20 transmits the set provision availability information to the information providing apparatus 100 in Step S205. At this time, the user terminal 20 additionally transmits the user ID (for example, a cookie) to the information providing apparatus 100.

Then, when the provision availability information is received from the user terminal 20, the reception unit 133 of the information providing apparatus 100 stores the provision availability information in "provision/no-provision" included in the user attribute table 122 in association with the user ID of the user terminal 20 in Step S206.

As above, according to the advertisement delivery system 1 of the first embodiment, in a case where any one of the site providing apparatuses $10_1$ to $10_n$ is accessed, the user terminal 20 can set whether to permit the provision of the user information for the advertisement delivery apparatus 200 altogether. In other words, the user terminal 20 can set whether the user information provided for the information providing apparatus 100 from the site providing apparatuses $10_1$ to $10_n$ may be provided for the advertisement delivery apparatus 200. Thus, according to the advertisement delivery system 1 of the first embodiment, it can be set whether the user information is distributed to the advertisement delivery apparatus 200 without increasing the operation burden of the user. In addition, since the advertisement delivery system 1 does not request the user terminal 20, for which the setting of provision/no-provision has been completed, to perform the setting of provision/no-provision again, the operation burden of the user can be reduced further.

1-8. Action (Information Providing Process)

Next, the sequence of an information providing process performed by the information providing apparatus 100 according to the first embodiment will be described with reference to FIG. 11. Such an information providing process is a process that is repeatedly performed by the control unit 130.

Figure 11:
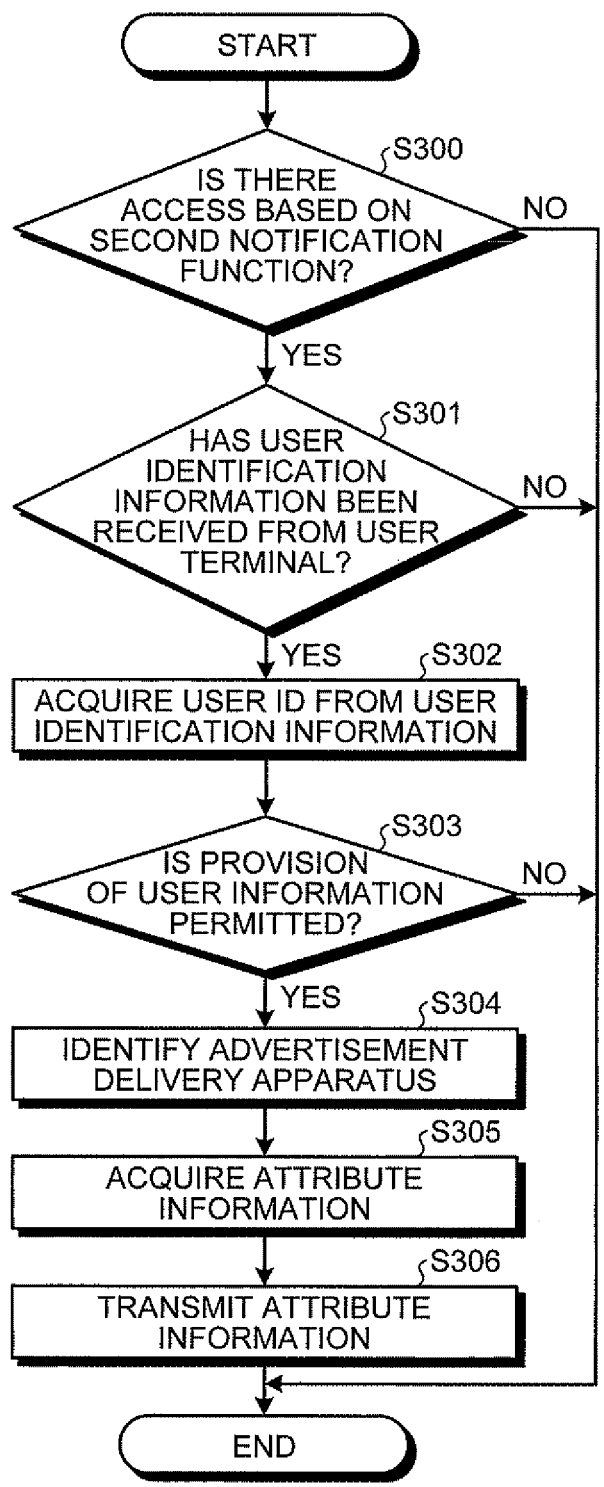
FIG. 11 is a flowchart that illustrates the sequence of an information providing process of the information providing apparatus according to the first embodiment.

As illustrated in FIG. 11, the provision determining unit 134 of the control unit 130 determines whether there is an access that is based on the second notification function from the user terminal 20 in Step S300. For example, the provision determining unit 134 determines whether there is an access that is based on a web beacon embedded in a portal page provided by the advertisement delivery apparatus 200. This point will be described. When the portal page is accessed from the user terminal 20, the request unit 231 of the advertisement delivery apparatus 200 transmits the portal page including the second notification function to the user terminal 20, thereby allowing the user terminal 20 to access the information providing apparatus 100. In other words, the request unit 231 transmits a request for acquiring user information to the information providing apparatus 100 through the user terminal 20. Accordingly, the provision determining unit 134 of the information providing apparatus 100 determines whether the request for acquiring user information has been received from the advertisement delivery apparatus 200 in Step S200. In such a determination process, when there is no access that is based on the second notification function from the user terminal 20 (No in Step S300), the provision determining unit 134 ends the information providing process.

On the other hand, when there is an access that is based on the second notification function from the user terminal 20 (Yes in Step S300), the provision determining unit 134 determines whether user identification information such as a cookie has been received from the user terminal 20 making the access that is based on the second notification function in Step S301. In such a process, when the user identification information is received (Yes in Step S301), the provision determining unit 134 acquires the user ID of the user terminal 20 based on the received user identification information in Step S302.

Then, the provision determining unit 134 acquires provision or no-provision for the user ID of the user terminal 20 from the user attribute table 122 and determines whether the provision of the user information for the advertisement delivery apparatus 200 is permitted based on the acquired provision or no-provision in Step S303. At this time, in a case where the provision/no-provision stored in the user attribute table 122 is "opposition", the provision determining unit 134 determines that the provision of the user information is not permitted (No in Step S303) and ends the information providing process.

On the other hand, in a case where the provision/no-provision stored in the user attribute table 122 is "permission", the provision determining unit 134 determines that the provision of the user information is permitted (Yes in Step S303). In such a case, the request reply unit 135 identifies the advertisement delivery apparatus 200 that provides the portal page, which includes the second notification function, accessed by the user terminal 20 in Step S304. More specifically, since the identification information of the advertisement delivery apparatus 200 is received from the user terminal 20 that has made the access, which is based on the second notification function, the request reply unit 135 identifies the advertisement delivery apparatus 200 based on the identification information. For example, when the user terminal 20 makes an access that is based on the second notification function, the user terminal 20 accesses the information providing apparatus 100 with the identification information of the advertisement delivery apparatus 200 and access unique information that is different for each access to the portal page being added to the URL of the access destination. In a case where the access that is based on the second notification function is made by the user terminal 20, the request reply unit 135 identifies the advertisement delivery apparatus 200 accessed by the user terminal 20 based on the identification information of the advertisement delivery apparatus 200 and the access unique information for the portal page.

Subsequently, the request reply unit 135 extracts the user information (attribute information) corresponding to the user ID of the user terminal 20 that has made the access that is based on the second notification function from the user attribute table 122 in Step S305. More specifically, the request reply unit 135 extracts the psychographic attribute and the demographic attribute stored in the user attribute table 122 in association with the user ID of the user terminal 20 that has made the access that is based on the second notification function.

Subsequently, the request reply unit 135 transmits the attribute information extracted from the user attribute table 122 to the advertisement delivery apparatus 200 identified in Step S304 together with the access unique information in Step S306.

From this, the request unit 231 of the advertisement delivery apparatus 200 receives the attribute information (user information) and the access unique information transmitted from the information providing apparatus 100. Then, the delivery unit 232 of the advertisement delivery apparatus 200 specifies the user terminal 20 that has accessed the portal page in which the second notification function is embedded based on the access unique information received by the request unit 231 and delivers advertisement content according to the attribute information transmitted from the information providing apparatus 100 to the user terminal 20. From this, the portal page including the advertisement content is delivered from the advertisement delivery apparatus 200, and the user terminal 20 displays the portal page on a browser or the like.

In FIG. 11, as the user information transmitted from the information providing apparatus 100 to the advertisement delivery apparatus 200, while the attribute information including the "psychographic attribute" and the "demographic attribute" is described as an example, the user information is not limited thereto. For example, the user information transmitted from the information providing apparatus 100 to the advertisement delivery apparatus 200 may be attribute information including one of the "psychographic attribute" and the "demographic attribute".

When the user terminal 20 accesses the portal page in Step S300, the advertisement delivery apparatus 200 provides the user terminal 20 with a portal page including an advertisement frame used for displaying advertisement content and portal content frame used for displaying various content (news, links to other sites, and the like) other than the advertisement content. At this time point, the user terminal 20 displays the portal page in which advertisement content is not displayed in the advertisement frame on the browser. Thereafter, when advertisement content is delivered from the advertisement delivery apparatus 200, the user terminal 20 may display the advertisement content in the advertisement frame by reloading only the advertisement frame included in the portal page or the like.

Alternatively, in Step S300, the advertisement delivery apparatus 200 may provide the user terminal 20 with a portal page in which the advertisement frame is redirected to a predetermined URL of the advertisement delivery apparatus 200. In such a case, while the user terminal 20 displays the portal page in which advertisement content is not displayed in the advertisement frame, the user terminal 20 accesses the predetermined URL for the advertisement frame. Then, when the predetermined URL is accessed from the user terminal 20 based on the redirecting function set in the advertisement frame, the advertisement delivery apparatus 200 may deliver the advertisement content to the user terminal 20 as a reply to the access. From this, the user terminal 20 can display the advertisement content delivered from the advertisement delivery apparatus 200 in the advertisement frame without reloading the advertisement frame.

1-9. Advantages

As described above, according to the information providing apparatus 100 of the first embodiment, the user attribute table 122 stores the user information relating to the user terminal 20 accessing any one of a plurality of site providing apparatuses 10 (corresponding to an example of the content providing apparatuses). In addition, the reception unit 133 receives the provision availability information indicating whether provision of the user information relating to the user terminal 20 for an advertisement delivery apparatus 200 that delivers advertisement content based on the user information is permitted from the user terminal 20 accessing any one of the plurality of site providing apparatuses 10. The provision determining unit 134 determines whether the provision availability information corresponding to the user terminal 20 represents a provision permission in a case where an acquisition request for the user information relating to the user terminal 20 is received from the advertisement delivery apparatus 200. The request reply unit 135 replies to the advertisement delivery apparatus 200 with the user information of the user terminal 20 in a case where the provision permission is determined to be represented by the provision determining unit 134.

Therefore, according to the information providing apparatus 100 of the first embodiment, even in a case where there are a huge number of site providing apparatuses 10, a setting for indicating whether the user information is to be distributed to the advertisement delivery apparatus 200 can be made without increasing the operation burden of the user.

1-10. Other Embodiments

In the above-described embodiment, the reception unit 133 of the information providing apparatus 100, as described in Step S204 illustrated in FIG. 9, transmits the setting screen G11 as illustrated in FIG. 10 to the user terminal 20. When the cancel button 312 is pressed on such a setting screen G11, the reception unit 133 may set the provision/no-provision included in the user attribute table 122 to any one of "permission" and "opposition".

In addition, in the above-described embodiment, as described in Step S201 illustrated in FIG. 9, an example is illustrated in which the site providing apparatus 10 determines whether the setting of the provision/no-provision is in the completed state and, the provision/no-provision is not set again in the completed state of the setting of the provision/no-provision. However, even when the setting of the provision/no-provision is in the completed state, after a predetermined period elapses after the setting, the site providing apparatus 10 may check the user on whether the setting of the provision/no-provision is to be set again.

For example, the user attribute table 122 of the information providing apparatus 100 maintains update date and time at which the provision/no-provision has been updated. Then, when a request for inquiring whether the setting of the provision/no-provision is in the completed state is received from the reception determining unit 14 of the site providing apparatus 10, the control unit 130 replies to the site providing apparatus 10 with an indication indicating that the reception of the provision/no-provision is not in the completed state when the elapse time from the update date and time to the current date and time is a threshold or more. From this, the site providing apparatus 10 can check the user on whether the provision/no-provision is to be set again on a regular basis.

2. Second Embodiment

The information providing apparatus, the advertisement delivery system, the information providing method, and the information providing program according to the present application may be performed in various forms other than the above-described embodiment. In a second embodiment, other forms will be described.

2-1. Setting Unit of Provision/No-provision (1)

In the above-described embodiment, for each site providing apparatus 10 from which user information is acquired, an information providing apparatus 100 may set the provision/no-provision of the user information acquired from the site providing apparatus 10.

This will be described more specifically. First, the user attribute table 122 of the information providing apparatus 100, for each attribute division, stores acquisition source information used for identifying the site providing apparatus 10 that is the acquisition source of the attribute division. For example, the user attribute table 122 stores acquisition source information corresponding to each one of the attribute divisions of "cosmetics", "vehicle", "clothing", "traveling", "sex", and "age" for each user ID. For this, by referring to the user attribute table 122, the site providing apparatus 10 that is the acquisition source of each attribute division can be determined.

The acquisition source information of the user attribute table 122 is stored by the generation unit 132. For example, it is assumed that that the site providing apparatus $10_1$ provides a site page relating to "cosmetics". In such a case, the generation unit 132 is assumed to estimate that a user using the user terminal $20_1$ accessing the site providing apparatus $10_1$ is interested in the "cosmetics". In addition, the generation unit 132 is assumed to estimate the sex of the user using the user terminal $20_1$ as "female". In the case of this example, the generation unit 132 updates the information of "cosmetics" and "sex", which is included in the user attribute table 122, corresponding to a user ID "$20_1$" to "1" and stores "information for identifying the site providing apparatus $10_1$" in "acquisition source information" corresponding to the "cosmetics" and "sex".

In a case where the user attribute table 122 stores the acquisition source information as described above, the reception unit 133 of the information providing apparatus 100 transmits a setting screen used for setting the provision availability information for each site providing apparatus 10 to the user terminal 20.

Figures 12, 13:
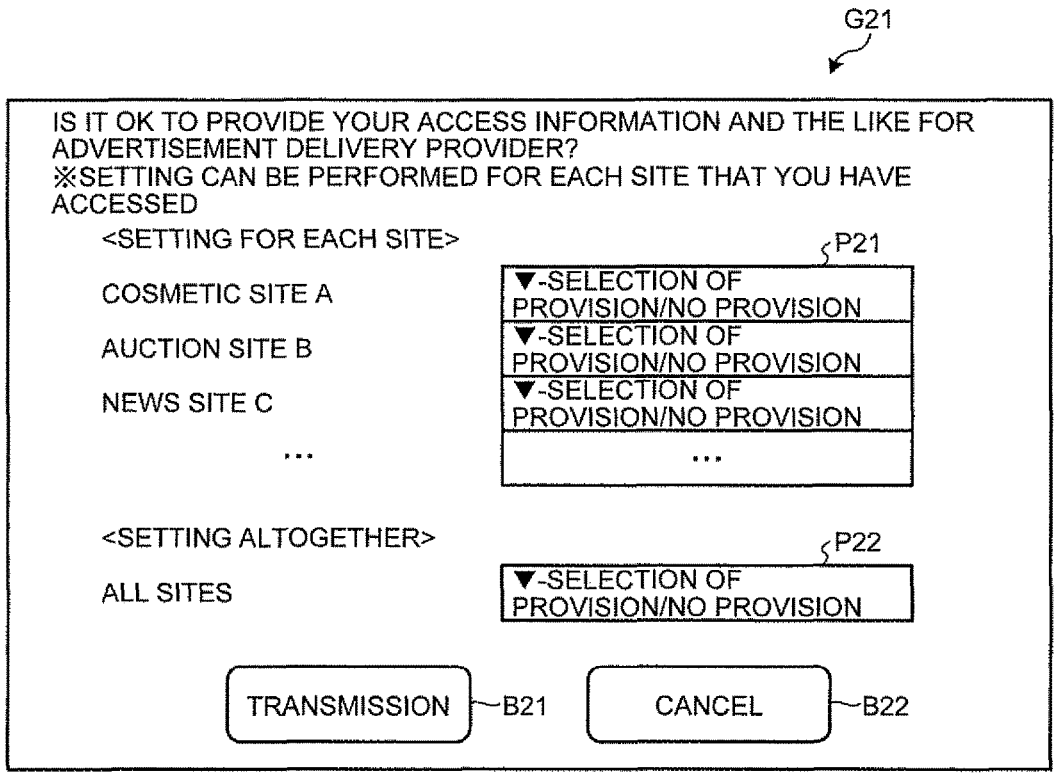
FIG. 12 is a diagram that illustrates an example of a setting screen according to a second embodiment.
FIG. 13 is a diagram that illustrates an example of a provision/no-provision table according to the second embodiment.

Here, FIG. 12 illustrates an example of the setting screen G21 transmitted by the reception unit 133 according to the second embodiment. On the setting screen G21 illustrated in FIG. 12, a selection pull-down menus P21 used for selecting provision/no-provision for each site providing apparatus 10, a selection pull-down menu P22 used for selecting provision/no-provision that is common to all the site providing apparatuses 10, a transmission button B21, and a cancel button B22 are included.

The selection pull-down menu P21, for each site providing apparatus 10, allows a selection of the provision/no-provision of the user information provided for the information providing apparatus 100 by the site providing apparatus 10. In the example illustrated in FIG. 12, a user can individually select permission or no permission of the provision of user information supplied from a cosmetic site A to the information providing apparatus 100, user information supplied from an auction site B to the information providing apparatus 100, and user information supplied from a news site C to the information providing apparatus 100 for the advertisement delivery apparatus 200. In addition, the selection pull-down menu P22 allows a selection of the provision/no-provision of the user information provided by each site providing apparatus 10 altogether. The selection pull-down menu P22 is the same as the selection pull-down menu P11 illustrated in FIG. 10.

The user terminal 20 transmits the provision availability information set on the setting screen G21 to the information providing apparatus 100. Then, the reception unit 133 of the information providing apparatus 100 stores the provision availability information received from the user terminal 20 in the user information DB 120.

Here, in the first embodiment, while an example is illustrated in which the provision/no-provision is stored in the user attribute table 122, in the information providing apparatus 100 according to the second embodiment, the provision/no-provision may be stored in a table (hereinafter, referred to as "provision/no-provision table") other than the user attribute table 122. For example, the information providing apparatus 100 may store the provision/no-provision in a provision/no-provision table 123 as illustrated in FIG. 13.

The provision/no-provision table 123 illustrated in FIG. 13, for each site providing apparatus 10 from which the information providing apparatus 100 acquires user information, stores provision/no-provision of the user information. In the example illustrated in FIG. 13, "site providers" included in the provision/no-provision table 123 are information used for identifying the site providing apparatuses 10 and correspond to reference signs assigned to the site providing apparatuses $10_1$ to $10_n$, illustrated in FIG. 2.

In other words, in the example illustrated in FIG. 13, it is represented that, among user information relating to the user terminal $20_1$, the user information acquired from the site providing apparatus $10_1$ is not permitted to be provided for the advertisement delivery apparatus 200, and user information acquired from the site providing apparatus $10_2$ is permitted to be provided for the advertisement delivery apparatus 200.

Then, when a request for acquiring user information is received from the advertisement delivery apparatus 200, the provision determining unit 134 according to the second embodiment determines user information that is permitted to be provided for the advertisement delivery apparatus 200 among the user information stored in the user attribute table 122 based on the provision availability information stored in the provision/no-provision table 123 and the acquisition source information stored in the user attribute table 122. Then, the request reply unit 135 replies to the advertisement delivery apparatus 200 with the user information determined to represent the permission of the provision by the provision determining unit 134.

From this, since the information providing apparatus 100 can set the provision/no-provision for each site providing apparatus 10 altogether, the provision/no-provision can be set in a flexible manner without increasing the operation burden of the user.

2-2. Setting Unit of Provision/No-provision (2)

In the above-described embodiment, the information providing apparatus 100, for each advertisement delivery apparatus 200, may set the provision of user information for the advertisement delivery apparatus 200. This point will be described more specifically. The reception unit 133 transmits a setting screen G31 as illustrated in FIG. 14 as an example to the user terminal 20.

Figures 14, 15:
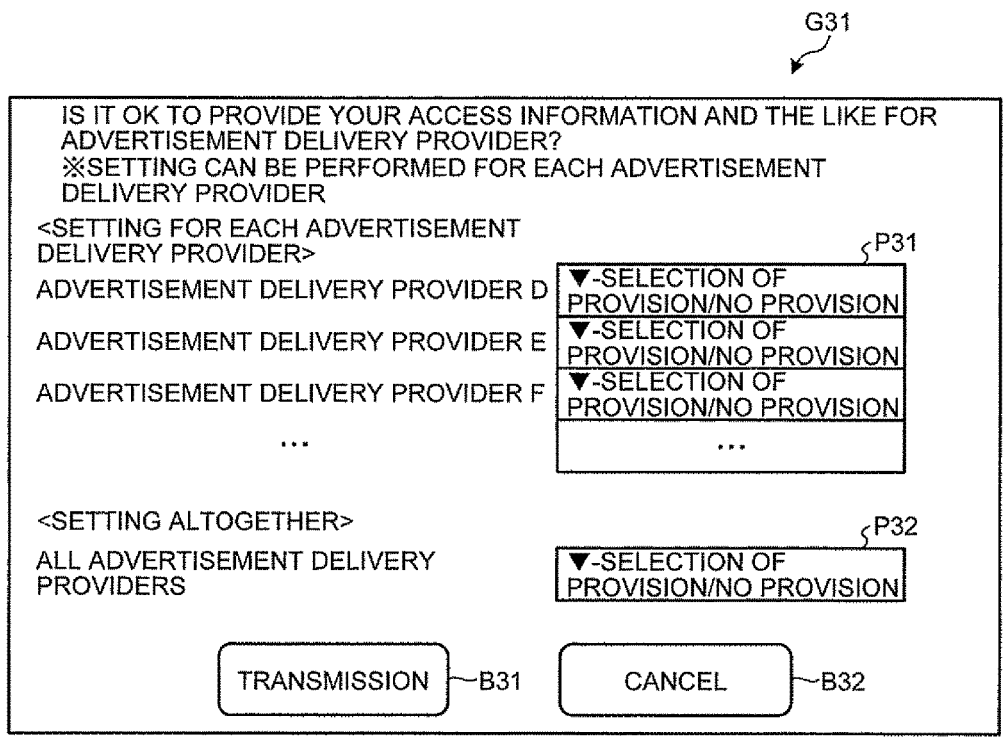
FIG. 14 is a diagram that illustrates an example of a setting screen according to the second embodiment.
FIG. 15 is a diagram that illustrates an example of a provision/no-provision table according to the second embodiment.

On the setting screen G31 illustrated in FIG. 14, selection pull-down menus P31 used for selecting provision/no-provision for each advertisement delivery apparatus 200 that is a provision destination of the user information, a selection pull-down menu P32 used for selecting provision/no-provision that is common to all the advertisement delivery apparatuses 200, a transmission button 831, and a cancel button 832 are included.

The selection pull-down menu P31, for each advertisement delivery apparatus 200, allows a selection of the provision/no-provision for the advertisement delivery apparatus 200. In the example illustrated in FIG. 14, a user can individually select provision or no-provision for advertisement delivery providers D, E, and F. In addition, the selection pull-down menu P32 allows a selection of the provision/no-provision for all the advertisement delivery apparatuses 200 together. The selection pull-down menu P32 is the same as the selection pull-down menu P11 illustrated in FIG. 10.

The user terminal 20 transmits the provision availability information set on the setting screen G31 to the information providing apparatus 100. Then, the reception unit 133 of the information providing apparatus 100 stores the provision availability information received from the user terminal 20 in the user information DB 120.

Here, the information providing apparatus 100 may store the provision or no-provision in the provision/no-provision table 123 as illustrated in FIG. 15 as an example. The provision/no-provision table 123 illustrated in FIG. 15, for each advertisement delivery apparatus 200, stores provision/no-provision for the advertisement delivery apparatus 200. In the example illustrated in FIG. 15, "advertisement delivery providers" included in the provision/no-provision table 123 are information used for identifying the advertisement delivery apparatuses 200 and correspond to reference signs assigned to the advertisement delivery apparatuses 200$_1$ to 200$_N$ illustrated in FIG. 2.

In other words, in the example illustrated in FIG. 15, it is represented that user information relating to the user terminal 20$_1$ is not permitted to be provided for the advertisement delivery apparatus 200$_1$ but is permitted to be provided for the advertisement delivery apparatus 200$_2$.

Then, when a request for acquiring user information is received from the advertisement delivery apparatus 200, the provision determining unit 134 determines whether the user information is permitted to be provided for the advertisement delivery apparatus 200 based on the provision availability information stored in the provision/no-provision table 123 illustrated in FIG. 13. Then, the request reply unit 135 replies to the advertisement delivery apparatus 200, which is the transmission source of the acquisition request, with the user information in a case where the provision is determined to be permitted by the provision determining unit 134.

From this, since the information providing apparatus 100 can set the provision/no-provision for each advertisement delivery apparatus 200 altogether, the provision/no-provision can be set in a flexible manner without increasing the operation burden of the user.

In addition, the reception unit 133 of the information providing apparatus 100 may transmit a setting screen acquired by combining the above-described setting screens to the user terminal 20. For example, the reception unit 133 may transmit a setting screen on which the permission of the provision can be set for each site providing apparatus 10 and for each advertisement delivery apparatus 200 to the user terminal 20. In the case of this example, the user can perform a setting in which the user information acquired by the information providing apparatus 100 from the site providing apparatus 10$_1$ is permitted to be provided for the advertisement delivery apparatus 200$_1$, and the user information acquired from the site providing apparatus 10$_2$ is not permitted to be provided for the advertisement delivery apparatus 200$_2$.

2-3. Transmission Subject of Setting Screen

In the above-described embodiment, when the site providing apparatus 10 is accessed from the user terminal 20, the setting of the provision/no-provision is performed by allowing the user terminal 20 to access the information providing apparatus 100. However, the site providing apparatus 10 may receive the provision availability information from the user terminal 20 and transmit the received provision availability information to the information providing apparatus 100.

For example, when being accessed from the user terminal 20, the site providing apparatus 10 may transmit the setting screen G11 as illustrated in FIG. 10 to the user terminal 20. Then, the site providing apparatus 10 may transmit the provision availability information received from the user terminal 20 to the information providing apparatus 100.

In addition, for example, the site providing apparatus 10 may acquire information relating to each site provider providing the information providing apparatus 100 with the user information from the information providing apparatus 100 and transmit the setting screen G21 as illustrated in FIG. 12 as an example to the user terminal 20. Then, the site providing apparatus 10 may transmit the provision availability information for each site providing apparatus 10 that is set on the setting screen G21 as illustrated in FIG. 12 to the information providing apparatus 100.

Furthermore, by acquiring information relating to each advertisement delivery apparatus for which the information providing apparatus 100 may provide user information from the information providing apparatus 100, the site providing apparatus 10 may transmit the setting screen G31 as illustrated in FIG. 14 to the user terminal 20. Then, the site providing apparatus 10 may transmit the provision availability information for each advertisement delivery apparatus 200 set on the setting screen G31 as illustrated in FIG. 14 as an example to the information providing apparatus 100.

In addition, in the above-described example, the site providing apparatus 10 may transmit the setting screen used for setting the provision availability information corresponding to a plurality of the information providing apparatuses 100 to the user terminal 20. More specifically, a plurality of the information providing apparatuses 100 may be included in the advertisement delivery system 1. In such a case, for each information providing apparatus 100, the site providing apparatus 10 may transmit a setting screen, which is used for setting permission/no-permission of the provision of the user information for the advertisement delivery apparatus 200 from the information providing apparatus 100, to the user terminal 20. From this, the user can set the provision/no-provision for the plurality of the information providing apparatuses 100 included in the advertisement delivery system 1 altogether. As a result of this, the site providing apparatus 10 may further reduce the operation burden of the user at the time of setting the provision/no-provision.

Furthermore, the site providing apparatus 10 may transmit a setting screen acquired by combining the above-described setting screens to the user terminal 20. For example, for each information providing apparatus 100, the site providing apparatus 10 may transmit a setting screen on which the permission of the provision for each site providing apparatus 10 and for each advertisement delivery apparatus 200 can be set to the user terminal 20.

2-4. Configuration of System

In the above-described embodiment, an example has been illustrated in which the advertisement delivery apparatus 200 acquires attribute information matching the user ID of the user terminal 20 accessing the portal site from the information providing apparatus 100 and performs targeting delivery using the acquired attribute information. However, the information providing apparatus 100 may perform modeling of user's tastes and the like using the user information that is constantly received in accordance with an access that is based on the first notification function and provide user information using such a model. In other words, even in a case where the psychographic attribute matching the user ID of the user terminal 20 accessing the portal page is not maintained, the information providing apparatus 100 may transmit a psychographic attribute of another user having a graphic attribute that is approximately the same as such a user to the advertisement delivery apparatus 200.

2-5. Information Providing Process

In the above-described embodiment, an example has been described in which the user information is transmitted from the information providing apparatus 100 to the advertisement delivery apparatus 200. However, the information that is transmitted from the information providing apparatus 100 to the advertisement delivery apparatus 200, for example, may be information of the user's access history. In such a case, the advertisement delivery apparatus 200 selects advertisement content based on the information of the user's access history and delivers the advertisement content.

In addition, in the above-described embodiment, while the history of accesses of the user terminal 20 to the site providing apparatus 10 is sequentially acquired, the user information that is based on the history of accesses is provided for the advertisement delivery apparatus 200. However, in a case where a predetermined amount of user information is allocated to the advertisement delivery apparatus 200, user information that is based on the history of accesses at a specific time point may be provided for the advertisement delivery apparatus 200.

2-6. Access History Table

In the above-described embodiment, the access history table 121 has been described to store the number of accesses for each site providing apparatus 10. However, in the access history table 121, the number of accesses for each site page (URL) of each site providing apparatus 10 may be stored. From this, the user's attribute information can be determined with further higher accuracy. The count for each site page, for example, may be realized by including identification information of each site page in the first notification function in addition to the identification information of the site providing apparatus 10.

In addition, in the access history table 121, access date and time at which the user terminal 20 accesses the site page, a time length during which the user terminal 20 accesses the site page, and the like may be stored. From this, the information providing apparatus 100 can determine the user's attribute information with further higher accuracy.

2-7. User Attribute Table

In the above-described embodiment, the attribute divisions of the user attribute table 122 are described as illustrated in FIG. 5. However, in a case where a plurality of the advertisement delivery apparatuses 200 are included in the advertisement delivery system 1, the user attribute table 122 may be stored with being divided into mutually-different attribute divisions for each advertisement delivery apparatus 200 or one or more advertisement delivery apparatuses 200. From this, the information providing apparatus 100 can provide user information according to the advertisement delivery apparatus 200.

2-8. First Notification Function

In the above-described embodiment, an example has been illustrated in which the first notification function is embedded in the site page provided by the site providing apparatus 10. However, the first notification function may be embedded in an HTML mail such as a mail magazine delivered to the user terminal 20 by a mail providing apparatus. From this, the information providing apparatus 100 can collect user information also from the user terminal 20 that has received the HTML mail, and accordingly, the user's attribute information can be determined with further higher accuracy.

2-9. Advertisement

In the above-described embodiment, although the advertisement content delivered from the advertisement delivery apparatus 200 to the user terminal 20 has been described as a banner advertisement, the advertisement content is not limited to the banner advertisement. For example, the advertisement content delivered from the advertisement delivery apparatus 200 to the user terminal 20 may be a motion picture advertisement, a text advertisement, an audio advertisement, or the like.

In addition, in the above-described embodiment, although the advertisement content has been described to be delivered from the advertisement delivery apparatus 200 to the user terminal 20, the apparatus delivering the advertisement content may be an advertisement server apparatus other than the advertisement delivery apparatus 200. For example, in a case where targeting delivery is performed for the user terminal 20, the advertisement delivery apparatus 200 may provide a portal page in which a URL used for accessing advertisement content that is a delivery target is described to the user terminal 20. From this, when a portal page is acquired from the advertisement delivery apparatus 200, the user terminal 20 acquires advertisement content by accessing the URL described in the portal page.

2-10. Others

As above, while several embodiments of the present application have been described in detail with reference to the drawings, the embodiments are examples. Thus, the present invention can be performed in other forms in which various changes and modifications are made in the form described in "Disclosure of Invention" based on the knowledge of those skilled in the art.

In addition, the information providing apparatus 100 or the advertisement delivery apparatus 200 described above may be implemented by a plurality of server computers, and the configuration thereof may be flexibly changed depending on the functions by implementing the functions by calling an external platform or the like using an application programming interface (API), network computing, or the like.

Furthermore, "means" described in the claims may be replaced with "a section, a module, or a unit", a "circuit", or the like. For example, reception means may be replaced with a reception unit or a reception circuit.

According to an aspect of an embodiment, the information providing apparatus have an advantage of enabling an advertisement delivery provider to set whether to distribute user information to an advertisement delivery provider without increasing the user's operation burden.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing apparatus comprising:
a memory; and
a processor coupled to the memory and programmed to:
receive an access request corresponding to a user terminal, via a first web beacon from one of a plurality of site providing apparatuses that provides a site accessed from the user terminal, the first web beacon being embedded in the site;
generate and transmit user identification to the user terminal;
receive user information of the user terminal together with the generated user identification, via the first web beacon from the one of a plurality of site providing apparatuses that provides the site accessed from the user terminal;
store the received user information in the memory in association with the generated user identification;
receive a setting request for setting provision availability information from the user terminal accessing one of the plurality of site providing apparatuses, the provision availability information indicating whether provision of the user information stored in association with the generated user identification for an advertisement delivery apparatus is permitted or not for each of the plurality of site providing apparatuses, the advertisement delivery apparatus delivering advertisement content based on the user information;
transmit a setting screen to the user terminal, the setting screen allowing selecting provision/no-provision for each site providing apparatus and selecting provision/no-provision commonly for all of the site providing apparatuses;
receive the provision availability information together with the generated user identification from the user terminal;
store the received provision availability information in the memory in association with the generated user identification;
receive an acquisition request together with the user identification generated in response to the access request received via the first web beacon, via a second web beacon from the advertisement delivery apparatus that provides a page accessed from the user terminal, the second web beacon being embedded in the page provided by the advertisement delivery apparatus, the acquisition request requesting transmission of the user information received from the one of a plurality of site providing apparatuses via the first web beacon;
determine whether the provision availability information stored in association with the generated user identification represents a provision permission; and
send the user information of the user terminal to the advertisement delivery apparatus when the provision permission is determined to be represented.

2. The information providing apparatus according to claim 1,
wherein the memory stores the user information provided by the content providing apparatus accessing the user terminal,
wherein the processor receives the provision availability information indicating whether provision of the user information for the advertisement delivery apparatus is permitted for each of the plurality of content providing apparatuses from each content providing apparatus,
wherein the processor determines the user information that is permitted to be provided for the advertisement delivery apparatus among the user information stored in the memory based on the provision availability information in a case where the acquisition request is received from the advertisement delivery apparatus, and
wherein the processor replies to the advertisement delivery apparatus with the user information determined to represent the provision permission.

3. The information providing apparatus according to claim 1,
wherein the processor receives the provision availability information indicating whether the provision of the user information for the advertisement delivery apparatus is permitted for each advertisement delivery apparatus, and
wherein the processor determines whether the provision availability information corresponding to the advertisement delivery apparatus represents a provision permission in a case where the acquisition request is received from the advertisement delivery apparatus.

4. The information providing apparatus according to claim 2,
wherein the processor receives the provision availability information indicating whether the provision of the user information for the advertisement delivery apparatus is permitted for each advertisement delivery apparatus, and
wherein the processor determines whether the provision availability information corresponding to the advertisement delivery apparatus represents a provision permission in a case where the acquisition request is received from the advertisement delivery apparatus.

5. An advertisement delivery system comprising:
an information providing apparatus;
an advertisement delivery apparatus, and
a content providing apparatus that includes a processor programmed to:
provide user information relating to a user terminal for the information providing apparatus when being accessed from the user terminal; and
notify the user terminal so as to transmit provision availability information indicating whether provision of the user information for the advertisement delivery apparatus is permitted when being accessed from the user terminal, wherein the information providing apparatus includes:
a memory; and
a processor coupled to the memory and programmed to:
receive an access request corresponding to the user terminal, via a first web beacon from one of a plurality of site providing apparatuses that provides a site accessed from the user terminal, the first web beacon being embedded in the site;
generate and transmit user identification to the user terminal;
receive user information of the user terminal together with the generated user identification, via the first web beacon from the one of a plurality of site providing apparatuses that provides the site accessed from the user terminal;
store the received user information in the memory in association with the generated user identification;
receive a setting request for setting provision availability information from the user terminal accessing one of the plurality of site providing apparatuses, the provision availability information indicating whether provision of the user information stored in association with the generated user identification for an advertisement delivery apparatus is permitted or not for each of the plurality of site providing apparatuses, the advertisement delivery apparatus delivering advertisement content based on the user information;

transmit a setting screen to the user terminal, the setting screen allowing selecting provision/no-provision for each site providing apparatus and selecting provision/no-provision commonly for all of the site providing apparatuses;

receive the provision availability information together with the generated user identification from the user terminal;

store the received provision availability information in the memory in association with the generated user identification;

receive an acquisition request together with user identification generated in response to the access request received via the first web beacon, via a second web beacon from the advertisement delivery apparatus that provides a page accessed from the user terminal, the second web beacon being embedded in the page provided by the advertisement delivery apparatus, the acquisition request requesting transmission of the user information received from the one of a plurality of site providing apparatuses via the first web beacon;

determine whether the provision availability information stored in association with the generated user identification represents a provision permission; and send the user information of the user terminal to the advertisement delivery apparatus when the provision permission is determined to be represented.

6. The advertisement delivery system according to claim 5, wherein the processor is further programmed to determine whether the information providing apparatus is in a state of completion of reception of the provision availability information corresponding to the user terminal by inquiring the information providing apparatus when being accessed from the user terminal, and wherein the user terminal is notified so as to transmit the provision availability information in a case where the state of completion of the reception is determined.

7. The advertisement delivery system according to claim 5, wherein the user terminal is notified so as to transmit the provision availability information indicating whether provision of the user information for the advertisement delivery apparatus from the information providing apparatus is permitted for each information providing apparatus for which the content providing apparatus provides the user information.

8. The advertisement delivery system according to claim 6, wherein the user terminal is notified so as to transmit the provision availability information indicating whether provision of the user information for the advertisement delivery apparatus from the information providing apparatus is permitted for each information providing apparatus for which the content providing apparatus provides the user information.

9. An information providing method performed by an information providing apparatus having a memory, the information providing method comprising:

receiving an access request corresponding to a user terminal, via a first web beacon from one of a plurality of site providing apparatuses that provides a site accessed from the user terminal, the first web beacon being embedded in the site;

generating and transmitting user identification to the user terminal;

receiving user information of the user terminal together with generated user identification, via the first web beacon from the one of a plurality of site providing apparatuses that provides the site accessed from the user terminal;

storing the received user information in the memory in association with the use generated user identification;

receiving a setting request for setting provision availability information from the user terminal accessing one of the plurality of site providing apparatuses, the provision availability information indicating whether provision of the user information stored in association with the generated user identification for an advertisement delivery apparatus is permitted or not for each of the plurality of site providing apparatuses, the advertisement delivery apparatus delivering advertisement content based on the user information;

transmitting a setting screen to the user terminal, the setting screen allowing selecting provision/no-provision for each site providing apparatus and selecting provision/no-provision commonly for all of the site providing apparatuses;

receiving the provision availability information together with the generated user identification from the user terminal;

storing the received provision availability information in the memory in association with the generated user identification;

receiving an acquisition request together with user identification generated in response to the access request received via the first web beacon, via a second web beacon from the advertisement delivery apparatus that provides a page accessed from the user terminal, the second web beacon being embedded in the page provided by the advertisement delivery apparatus, the acquisition request requesting transmission of the user information received from the one of a plurality of site providing apparatuses via the first web beacon;

determining whether the provision availability information stored in association with the generated user identification represents a provision permission; and sending the user information of the user terminal to the advertisement delivery apparatus when the provision permission is determined to be represented in the determining of whether the provision availability information represents a provision permission.

10. A non-transitory computer-readable storage medium with an executable program stored thereon, the program instructing a computer having a memory to perform steps comprising:

receiving an access request corresponding to a user terminal, via a first web beacon from one of a plurality of site providing apparatuses that provides a site accessed from the user terminal, the first web beacon being embedded in the site;

generating and transmitting user identification to the user terminal;

receiving user information of the user terminal together with generated user identification, via the first web beacon from the one of a plurality of site providing apparatuses that provides the site accessed from the user terminal;

storing the received user information in the memory in association with the generated user identification;

receiving a setting request for setting provision availability information from the user terminal accessing one of the plurality of site providing apparatuses, the provision availability information indicating whether provision of the user information stored in association with the generated user identification for an advertisement delivery apparatus is permitted or not for each of the plurality of site providing apparatuses, the advertisement delivery apparatus delivering advertisement content based on the user information;

transmitting a setting screen to the user terminal, the setting screen allowing selecting provision/no-provision for each site providing apparatus and selecting provision/no-provision commonly for all of the site providing apparatuses;

receiving the provision availability information together with the generated user identification from the user terminal;

storing the received provision availability information in the memory in association with the generated user identification;

receiving an acquisition request together with user identification generated in response to the access request received via the first web beacon, via a second web beacon from the advertisement delivery apparatus that provides a page accessed from the user terminal, the second web beacon being embedded in the page provided by the advertisement delivery apparatus, the acquisition request requesting transmission of the user information received from the one of a plurality of site providing apparatuses via the first web beacon;

determining whether the provision availability information stored in association with the generated user identification represents a provision permission; and sending the user information of the user terminal to the advertisement delivery apparatus when the provision permission is determined to be represented in the determining of whether the provision availability information represents a provision permission.

11. The information providing apparatus according to claim 1, wherein the processor is further programmed to:
generate a psychographic attribute corresponding to attributes of the user based on the user's history;
store the psychographic attribute in the memory; and
determine the provision availability information corresponding to the user terminal represents a provision permission based on the psychographic attribute in a case where an acquisition request for the user information relating to the user terminal is received from the advertisement delivery apparatus.

12. The advertisement delivery system according to claim 5, wherein the processor of the information providing apparatus is further programmed to:
generate a psychographic attribute corresponding to attributes of the user based on the user's history;
store the psychographic attribute in the memory; and
determine the provision availability information corresponding to the user terminal represents a provision permission based on the psychographic attribute in a case where an acquisition request for the user information relating to the user terminal is received from the advertisement delivery apparatus.

13. The information providing method according to claim 9, further comprising:
generating a psychographic attribute corresponding to attributes of the user based on the user's history;
storing the psychographic attribute in the memory; and
determining the provision availability information corresponding to the user terminal represents a provision permission based on the psychographic attribute in a case where an acquisition request for the user information relating to the user terminal is received from the advertisement delivery apparatus.

14. The non-transitory computer-readable storage medium according to claim 10, further comprising the steps of:
generating a psychographic attribute corresponding to attributes of the user based on the user's history;
storing the psychographic attribute in the memory; and
determining the provision availability information corresponding to the user terminal represents a provision permission based on the psychographic attribute in a case where an acquisition request for the user information relating to the user terminal is received from the advertisement delivery apparatus.

15. The information providing apparatus according to claim 11, wherein the processor is further programmed to:
in a case where the psychographic attribute matching the user identification of the user terminal that has accessed the page is not stored in the memory, transmit, to the advertisement delivery apparatus, information regarding an other psychographic attribute of an other user having a psychographic attribute that is approximately the same as the user.

* * * * *